(12) United States Patent
Braley et al.

(10) Patent No.: US 10,639,826 B2
(45) Date of Patent: May 5, 2020

(54) CONDUCTIVE PRE-IMPREGNATED COMPOSITE SHEET AND METHOD FOR MAKING THE SAME

(71) Applicant: The Boeing Company, Chicago, IL (US)

(72) Inventors: Daniel J. Braley, St. Peters, MO (US); Justine M. Truscello, St. Louis, MO (US); Daniel R. Ferriell, St. Louis, MO (US); John H. Belk, St. Louis, MO (US); Stephen R. Heinz, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/119,039

(22) Filed: Aug. 31, 2018

(65) Prior Publication Data

US 2018/0370087 A1   Dec. 27, 2018

Related U.S. Application Data

(62) Division of application No. 15/095,546, filed on Apr. 11, 2016, now Pat. No. 10,093,041.

(51) Int. Cl.
*B29C 43/00* (2006.01)
*B29C 43/30* (2006.01)
(Continued)

(52) U.S. Cl.
CPC ............ *B29C 43/003* (2013.01); *B29C 43/24* (2013.01); *B29C 43/305* (2013.01);
(Continued)

(58) Field of Classification Search
CPC ...... B29K 2105/0872; B29K 2105/167; B29K 2995/0005; B32B 15/02; B32B 15/092;
(Continued)

(56) References Cited

U.S. PATENT DOCUMENTS

| 5,254,399 A | 10/1993 | Oku et al. |
| 7,345,242 B2 | 3/2008 | Chen |

(Continued)

FOREIGN PATENT DOCUMENTS

| EP | 2682262 | 1/2014 |
| WO | WO 2015/120011 | 8/2015 |

OTHER PUBLICATIONS

Garcia et al., "Joining prepreg composite interfaces with aligned carbon nanotubes," *Composites: Part A*, vol. 39, pp. 1065-1070 (2008).

(Continued)

*Primary Examiner* — Camie S Thompson
(74) *Attorney, Agent, or Firm* — Walters & Wasylyna LLC

(57) ABSTRACT

A method for making a conductive pre-impregnated composite sheet includes the steps of joining a nanomaterial composite sheet, a fiber-reinforcing sheet and a resin system to form a combined sheet, heating the combined sheet, compacting the combined sheet, and cooling the combined sheet to form conductive pre-impregnated composite sheet including the fiber-reinforcing sheet, and the nanomaterial composite sheet coupled to the fiber-reinforcing sheet, wherein the fiber-reinforcing sheet and the nanomaterial composite sheet are embedded in the resin system.

20 Claims, 9 Drawing Sheets

(51) Int. Cl.
| | | |
|---|---|---|
| *B29C 43/24* | (2006.01) | |
| *B29C 70/50* | (2006.01) | |
| *B29C 70/88* | (2006.01) | |
| *B32B 5/16* | (2006.01) | |
| *B32B 5/24* | (2006.01) | |
| *B29C 70/02* | (2006.01) | |
| *B32B 19/04* | (2006.01) | |
| *B32B 27/38* | (2006.01) | |
| *B32B 15/20* | (2006.01) | |
| *B32B 27/32* | (2006.01) | |
| *B32B 27/10* | (2006.01) | |
| *B32B 29/02* | (2006.01) | |
| *B32B 3/26* | (2006.01) | |
| *B32B 7/06* | (2019.01) | |
| *B32B 19/06* | (2006.01) | |
| *B32B 27/36* | (2006.01) | |
| *B32B 5/26* | (2006.01) | |
| *B32B 15/02* | (2006.01) | |
| *B32B 5/02* | (2006.01) | |
| *B32B 27/08* | (2006.01) | |
| *B32B 15/14* | (2006.01) | |
| *B32B 15/092* | (2006.01) | |
| *B32B 19/02* | (2006.01) | |
| *B32B 27/12* | (2006.01) | |
| *B29L 9/00* | (2006.01) | |
| *B29L 31/30* | (2006.01) | |
| *B29K 105/08* | (2006.01) | |
| *B29K 105/16* | (2006.01) | |

(52) U.S. Cl.
CPC .......... *B29C 70/025* (2013.01); *B29C 70/504* (2013.01); *B29C 70/882* (2013.01); *B32B 3/266* (2013.01); *B32B 5/022* (2013.01); *B32B 5/024* (2013.01); *B32B 5/026* (2013.01); *B32B 5/16* (2013.01); *B32B 5/24* (2013.01); *B32B 5/26* (2013.01); *B32B 7/06* (2013.01); *B32B 15/02* (2013.01); *B32B 15/092* (2013.01); *B32B 15/14* (2013.01); *B32B 15/20* (2013.01); *B32B 19/02* (2013.01); *B32B 19/041* (2013.01); *B32B 19/045* (2013.01); *B32B 19/06* (2013.01); *B32B 27/08* (2013.01); *B32B 27/10* (2013.01); *B32B 27/12* (2013.01); *B32B 27/322* (2013.01); *B32B 27/36* (2013.01); *B32B 27/38* (2013.01); *B32B 29/02* (2013.01); *B29K 2105/0872* (2013.01); *B29K 2105/167* (2013.01); *B29K 2995/0005* (2013.01); *B29L 2009/008* (2013.01); *B29L 2031/3082* (2013.01); *B32B 2255/02* (2013.01); *B32B 2255/20* (2013.01); *B32B 2255/205* (2013.01); *B32B 2260/021* (2013.01); *B32B 2260/046* (2013.01); *B32B 2262/02* (2013.01); *B32B 2262/0261* (2013.01); *B32B 2262/0269* (2013.01); *B32B 2262/0276* (2013.01); *B32B 2262/065* (2013.01); *B32B 2262/10* (2013.01); *B32B 2262/101* (2013.01); *B32B 2262/105* (2013.01); *B32B 2262/106* (2013.01); *B32B 2307/202* (2013.01); *B32B 2307/204* (2013.01); *B32B 2307/206* (2013.01); *B32B 2307/212* (2013.01); *B32B 2307/748* (2013.01); *B32B 2605/18* (2013.01)

(58) Field of Classification Search
CPC ......... B32B 15/14; B32B 15/20; B32B 19/02; B32B 19/041; B32B 19/045; B32B 19/06; B32B 2255/02; B32B 2255/20; B32B 2255/205; B32B 2260/021; B32B 2260/046; B32B 2262/02; B32B 2262/0261; B32B 2262/0269; B32B 2262/0276; B32B 2262/065; B32B 2262/10; B32B 2262/101; B32B 2262/105; B32B 2262/106; B32B 2301/202; B32B 2301/206; B32B 2301/212; B32B 2301/48; B32B 27/08; B32B 27/10; B32B 27/12; B32B 27/322; B32B 27/36; B32B 27/38; B32B 5/022; B32B 5/024; B32B 5/026; B32B 5/16; B32B 5/24; B32B 5/26; B32B 19/14; B32B 2307/202; B32B 2307/206; B32B 2307/212; B32B 2307/48; B32B 3/266; B32B 70/504; B32B 70/882; B32B 70/025; B29C 43/003; B29C 43/305; B29C 43/24
USPC ....... 428/221, 297.4; 442/327; 977/742, 752
See application file for complete search history.

(56) References Cited

U.S. PATENT DOCUMENTS

| | | |
|---|---|---|
| 7,459,121 B2 | 12/2008 | Liang et al. |
| 7,955,535 B2 | 6/2011 | Liang et al. |
| 8,137,653 B1 | 3/2012 | Predtechensky et al. |
| 8,283,403 B2 | 10/2012 | Mao et al. |
| 8,351,220 B2 | 1/2013 | Liang et al. |
| 8,657,990 B2 | 2/2014 | Tsotsis |
| 8,753,602 B2 | 6/2014 | Shanov et al. |
| 2007/0125493 A1 | 6/2007 | Jang et al. |
| 2014/0011414 A1* | 1/2014 | Kruckenberg ............ B32B 5/16 442/181 |
| 2014/0131096 A1 | 5/2014 | Silverman et al. |
| 2016/0001470 A1 | 1/2016 | Souza |
| 2017/0158511 A1 | 6/2017 | Braley et al. |
| 2017/0162300 A1 | 6/2017 | Hasan et al. |

OTHER PUBLICATIONS

Siddiqui et al. "Manufacturing and characterization of carbon fibre/epoxy composite prepregs containing carbon nanotubes," *Composites: Part A*, vol. 42, pp. 1412-1420 (2011).
Xu et al., "Enhanced Mechanical Properties of Prestressed Multi-Walled Carbon Nanotubes," *Small*, vol. 4 pp. 773-737 (2008).
Cheung, "Carbon nanotubes: From stress to strength: Prestressed multiwalled carbon nanotubes have enhanced mechanical properties that are ideal for building space elevators," *NatureChina* (2008).
Behabtu et al., "Stong Light, Multifunctional Fibers of Carbon Nanotubes with Ultrahigh Conductivity," *Science*, vol. 339, No. 182 (2013).
Wang et al., "High-Ampacity Power Cables of Tightly-Packed and Aligned Carbon Nanotubes," *Advanced Functional Materials*, vol. 24, pp. 3241-3249 (2014).
European Patent Office, "Extended European Search Report," App. No. 17161190.8 (dated Sep. 25, 2017).
European Patent Office, "Communication pursuant to Article 94(3) EPC," App. No. 17 161 190.8 (dated Jul. 9, 2019).
European Patent Office, "Communication pursuant to Article 94(3) EPC," App. No. 17 161 190.8 (dated Feb. 3, 2020).

* cited by examiner

CONDUCTIVE PRE-IMPREGNATED COMPOSITE SHEET AND METHOD FOR MAKING THE SAME

PRIORITY

This application is a divisional of U.S. Ser. No. 15/095,546 filed on Apr. 11, 2016.

FIELD

The present disclosure is generally related to composite materials and, more particularly, to a multifunctional conductive pre-impregnated composite sheet.

BACKGROUND

Aerospace vehicles are being designed and manufactured with greater percentages of composite materials. For example, composites may be used in the construction of various primary and secondary structures in aerospace applications, such as composite panels forming the airframe and/or exterior skin (e.g., fuselage, wings, etc.) of an aircraft. Use of composites may increase the strength, decrease the weight, and provide a longer service life of various components of the aerospace vehicle.

However, for aerospace vehicles having composite components, such as skin panels, it may be desirable to apply additional materials for lightning strike protection and/or to shield associated avionics and electronics from external electromagnetic interference. Such additional materials may undesirably increase the weight of the aerospace vehicle and increase the time and cost of production.

Accordingly, those skilled in the art continue with research and development efforts in the field of composite materials.

SUMMARY

In one example, the disclosed method for making a conductive pre-impregnated composite sheet includes the steps of: (1) joining a nanomaterial composite sheet, a fiber-reinforcing sheet and a resin system to form a combined sheet, (2) heating the combined sheet, (3) compacting the combined sheet, and (4) cooling the combined sheet.

In another example, the disclosed conductive pre-impregnated composite sheet includes a fiber-reinforcing sheet, and a nanomaterial composite sheet coupled to the fiber-reinforcing sheet, wherein the fiber-reinforcing sheet and the carbon nanomaterial composite sheet are embedded in a resin system.

In yet another example, the disclosed composite structure includes at least one fiber-reinforced polymer sheet, and a conductive pre-impregnated composite sheet, wherein the conductive pre-impregnated composite sheet includes a fiber-reinforcing sheet, and a nanomaterial composite sheet coupled to the fiber-reinforcing sheet, wherein the fiber-reinforcing sheet and the nanomaterial composite sheet are embedded in a resin system.

Other examples of the disclosed composite sheets and methods will become apparent from the following detailed description, the accompanying drawings and the appended claims.

DETAILED DESCRIPTION

Figure 1:
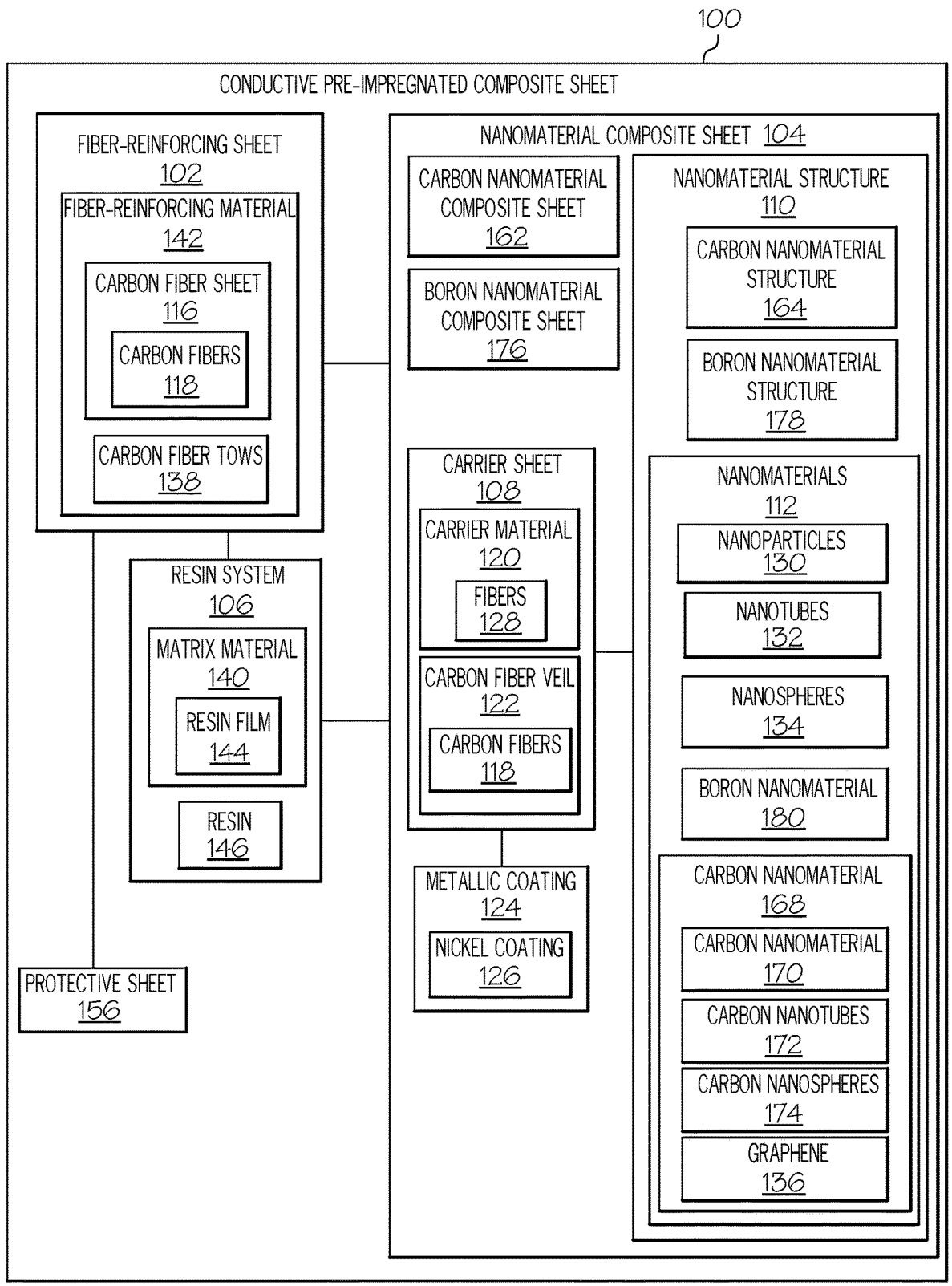
FIG. 1 is a schematic block diagram of one example of the disclosed conductive pre-impregnated composite sheet.

The following detailed description refers to the accompanying drawings, which illustrate specific examples described by the disclosure. Other examples having different structures and operations do not depart from the scope of the present disclosure. Like reference numerals refer to the same feature, element or component in the different drawings.

Figure 13:
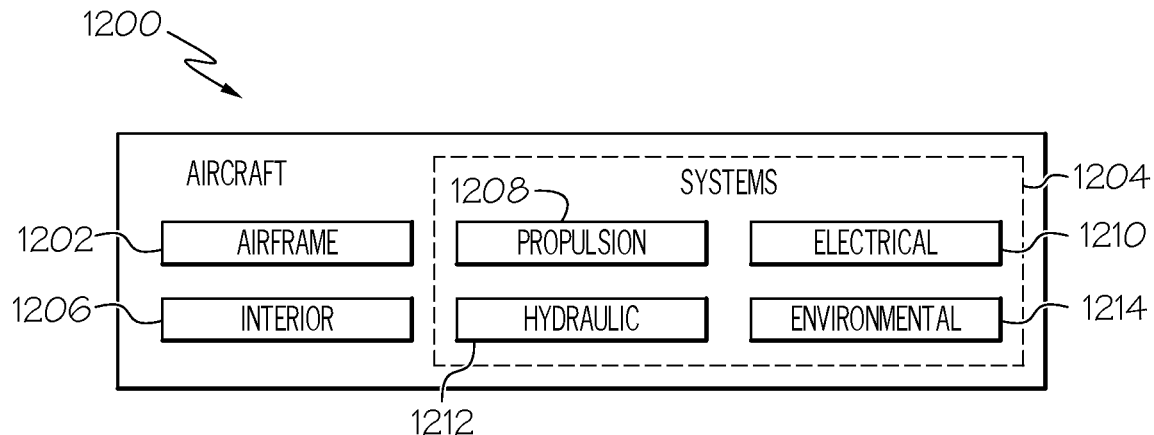
FIG. 13 is a schematic illustration of an aircraft.

In FIGS. 1 and 13, referred to above, solid lines, if any, connecting various elements and/or components represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines are either selectively provided or relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 13 may be combined in various ways without the need to include other features described in FIGS. 1 and 13, other drawing figures, and/or the accompanying disclosure, even though such combination or combinations are not explicitly illustrated herein. Similarly, additional features not limited to the examples presented, may be combined with some or all of the features shown and described herein.

Figure 5:
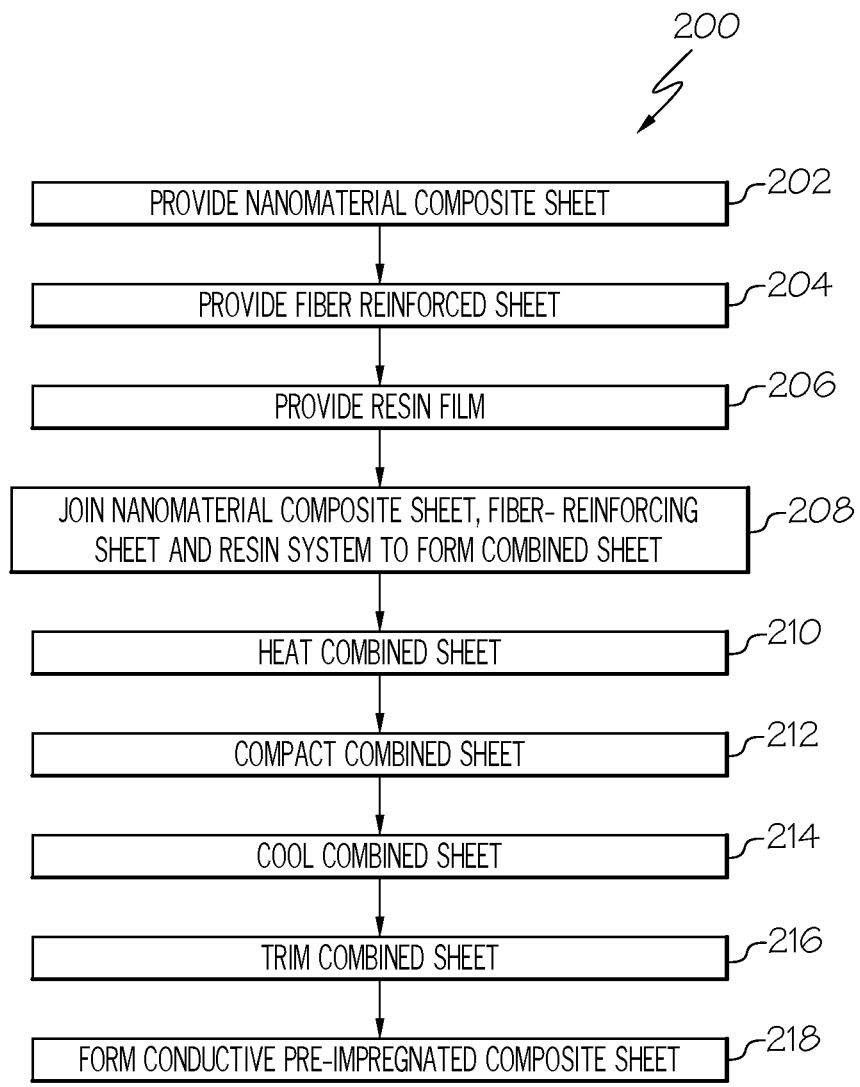
FIG. 5 is flow diagram of one example of the disclosed method for making the conductive pre-impregnated composite sheet.
Figure 12:
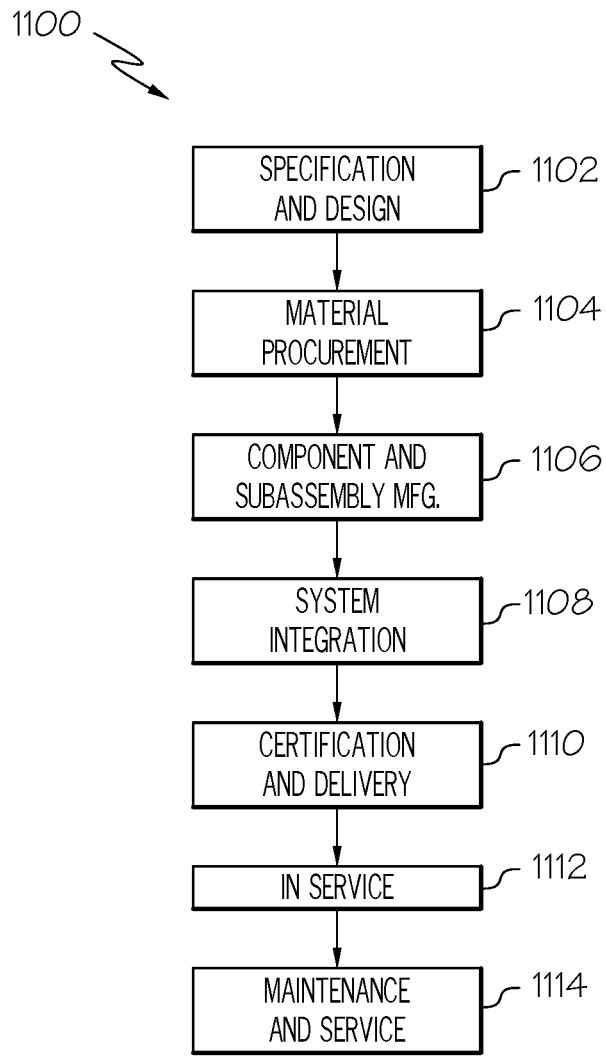
FIG. 12 is a block diagram of aircraft production and service methodology.

In FIGS. 5 and 12, referred to above, the blocks represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily claimed, of the subject matter according the present disclosure are provided below.

Referring to FIG. 1, one example of a conductive pre-impregnated composite sheet 100 is disclosed. In one example, the conductive pre-impregnated composite sheet 100 includes a fiber-reinforcing sheet 102 and a nanomaterial composite sheet 104 coupled to the fiber-reinforcing sheet 102. The fiber-reinforcing sheet 102 and the nanomaterial composite sheet 104 are embedded in a resin system 106. As one specific, non-limiting example, the nanomaterial composite sheet 104 is a carbon nanomaterial composite sheet 162. As another specific, non-limiting example, the nanomaterial composite sheet 104 is a boron nanomaterial composite sheet 176. As will be described in greater detail herein, in other examples, the nanomaterial composite sheet 104 may include other constituent materials.

The present disclosure recognizes and takes into account that the disclosed conductive pre-impregnated composite sheet 100, for example, as used with a composite structure 400 (FIG. 11), may provide multifunctional shielding from a variety of environmental effects, such as those from electromagnetic interference, radiation, electrical (e.g., lightning) and the like.

The fiber-reinforcing sheet 102 may also be referred to as a fiber-reinforcing layer or a fiber-reinforcing material layer. The fiber-reinforcing sheet 102 includes (e.g., is fabricated from) a fiber-reinforcing material 142. The fiber-reinforcing material 142 includes fiber, fibers and/or fiber material suitable to provide reinforcement to a matrix material (e.g., a polymer matrix, such as an epoxy resin).

Figure 11:
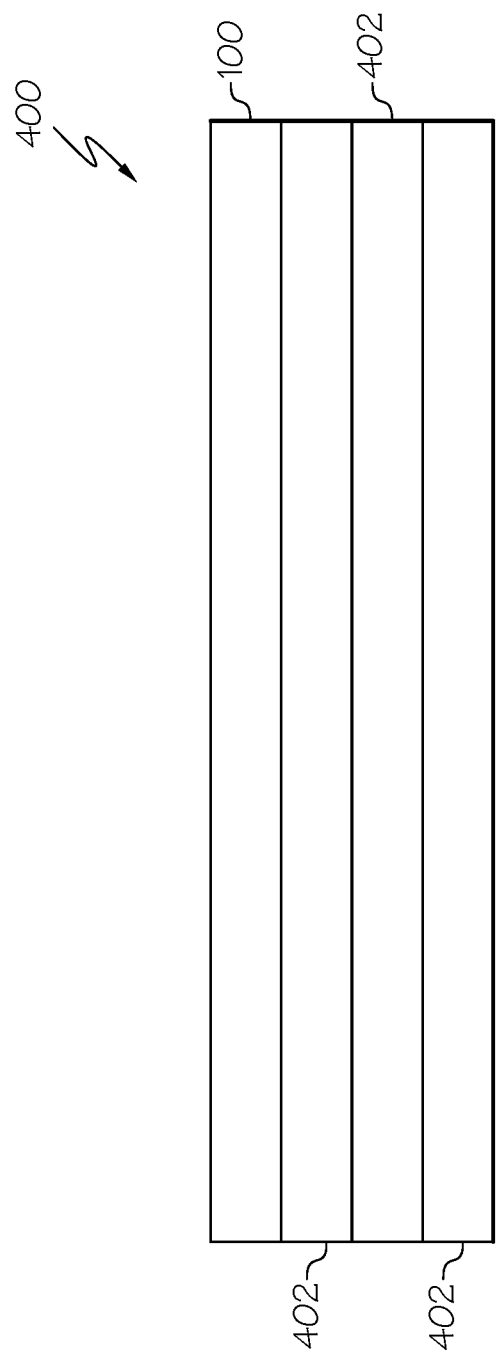
FIG. 11 is a schematic side elevation view of one example of the disclosed composite structure including the conductive pre-impregnated composite sheet.

The fiber-reinforcing sheet 102 provides reinforcement, increased tensile strength and increased impact strength to the conductive pre-impregnated composite sheet 100 (e.g., reinforces and increases the tensile and/or impact strength of the nanomaterial composite sheet 104). Thus, the reinforcement provided by the fiber-reinforcing sheet 102 allows the conductive pre-impregnated composite sheet 100 to be used in traditional manufacturing processes for the composite structure 400, such as being laid up on or draped over a mold with additional layers of fiber-reinforced polymer sheet 402 (FIG. 11).

In an exemplary example, the fiber-reinforcing sheet 102 includes (e.g., takes the form of) a nonwoven carbon fiber sheet 116, and the fiber-reinforcing material 142 includes (e.g., takes the form of) carbon fibers 118. Accordingly, the carbon fiber sheet 116 includes the carbon fibers 118 (e.g., a plurality of continuous strands of carbon fibers) that are randomly entangled or looped together to form a thin non-woven sheet, veil, ply, or mat of carbon fibers.

In another example, the fiber-reinforcing material 142 includes a plurality of unidirectional continuous carbon fiber tows 138 used to form the fiber-reinforcing sheet 102.

Other non-limiting examples of fiber-reinforcing material 142 include carbon (e.g., carbon fibers, such as general purpose HexForce® carbon fibers from Hexcel® Corporation of Stamford, Conn. or TORAYCA™ carbon fibers from Toray Industries, Inc. of New York, N.Y.), nylon (e.g., nylon fibers), polyester (e.g., polyester fibers), polyether ether ketone (PEEK) (e.g., PEEK fibers), polyetherketoneketone (PEKK) (e.g., PEKK fibers), fiberglass (e.g., fiberglass fibers) and the like.

Still other non-limiting examples of fiber-reinforcing material 142 include silicon carbide (e.g., silicon carbide fibers), alumina (e.g., alumina fibers), boron (e.g., boron fibers, such as boron fibers from Specialty Materials™ of Tulsa Okla.), glass (e.g., glass fibers, such as general purpose HexForce® glass fibers from Hexcel® Corporation), aramid (e.g., aramid fibers, such as general purpose HexForce® aramid fibers from Hexcel® Corporation), hemp (e.g., hemp fibers), quartz (e.g., quartz fibers), ceramic (e.g., ceramic fibers), basalt (e.g., basalt fibers) and combinations or hybrids thereof (e.g., Hexcel HexForce® hybrid reinforcement fibers from Hexcel® Corporation.)

In one example, the fiber-reinforcing sheet 102 includes a continuous fiber-reinforcing material 142 (e.g., continuous fiber reinforcement). In an exemplary example, the fiber-reinforcing sheet 102 takes the form of a nonwoven sheet. In other examples, the fiber-reinforcing sheet 102 takes the form of a nonwoven cloth, fabric, veil, ply, mat and the like. In yet other examples, the fiber-reinforcing sheet 102 takes the form of a woven cloth, fabric, sheet, veil, ply, mat and the like.

In one example, the nanomaterial composite sheet 104 includes a carrier sheet 108 and a nanomaterial structure 110 coupled to the carrier sheet 108. As one example, the nanomaterial composite sheet 104 includes the carrier sheet 108 and the nanomaterials 112 are overlaid onto the carrier sheet 108 to form the nanomaterial structure 110, for example, such that the nanomaterial structure 110 is bonded to the carrier sheet 108. As one example, the nanomaterial composite sheet 104 is a continuous sheet.

As one example, the nanomaterial structure 110 is permanently bonded to the carrier sheet 108. As another example, the nanomaterial composite sheet 104 is a nonwoven mat of the nanomaterials 112 coupled to the carrier sheet 108. As another example, the nanomaterial composite sheet 104 includes a forest of the nanomaterials 112 grown onto (e.g., directly onto) the carrier sheet 108. As yet another example, the nanomaterial composite sheet 104 includes aligned nanomaterials 112 in sheet form.

In an exemplary example, the nanomaterial structure 110 is a carbon nanomaterial structure 164, and the nanomaterials 112 are carbon nanomaterials 168. As an exemplary example, the carbon nanomaterials 168 are carbon nanotubes 172. As another example, the nanomaterial structure 110 includes a blend of different types of the carbon nanomaterials 168 (e.g., carbon nanotubes 172 and graphene 136), for example, taking the form of a nonwoven matt. As another example, the nanomaterial structure 110 includes the blend of different types of carbon nanomaterials 168 in the form of a nonwoven sheet or mat made of the carbon nanomaterials 168 (e.g., graphene 136) in which additional carbon nanomaterials 168 (e.g., carbon nanotubes 172) are processed such that at least some of the ends of the carbon nanomaterials 168 (e.g., carbon nanotubes 172) grow into a surface of the graphene sheet. Other configurations of the nanomaterial composite sheet 104 are also contemplated.

The carrier sheet 108 may also be referred to as a carrier layer or a carrier material layer. The carrier sheet 108 includes (e.g., is fabricated from) a carrier material 120. The carrier material 120 includes a suitable material upon which the nanomaterials 112 may be overlaid to form (e.g., build and/or bond) the nanomaterial structure 110 on a surface of the carrier sheet 108. As one example, the carrier sheet 108 includes a continuous carrier material 120. As one example, the carrier sheet 108 takes the form of a nonwoven cloth, fabric, veil, sheet, ply, mat and the like. Generally, the carrier sheet 108 provides a backbone for attachment of the nanomaterials 112.

In an exemplary example, the carrier sheet 108 includes a nonwoven carbon fiber veil 122. The nonwoven carbon fiber veil 122 provides a backbone for attachment of the carbon nanomaterials 168 (e.g., the carbon nanotubes 172) to produce the conductive surface layer of the conductive pre-impregnated composite sheet 100.

As one example, the carrier sheet 108 is conductive. The conductive carrier sheet 108 provides enhanced lightning strike protection and broadband shielding effectiveness, for example, of the composite structure 400 (FIG. 11) made using the conductive pre-impregnated composite sheet 100.

As one example, the carrier sheet 108 non-conductive. The non-conductive carrier sheet 108 is beneficial in some cases to provide a dielectric or non-conductive barrier between the composite structure 400 (FIG. 11) (e.g., a laminate) and the conductive pre-impregnated composite sheet 100 (e.g., a surface protection layer). Surface protection is ultimately for lightning strike protection and broadband shielding effectiveness, but depending on the location of the application of the conductive pre-impregnated composite sheet 100 on an aircraft, the requirements and levels can change on the same aircraft (zoning requirements for lightning strike, and frequency requirements for electronics that are ultimately being protected or shielded from the environment).

Whether the carrier sheet 108 is conductive or non-conductive may depend on, for example, a particular application and/or desired properties of the nanomaterial composite sheet 104.

In one general example, the carrier material 120 includes fibers 128 that are entangled or looped together to form a thin non-woven carrier sheet 108. Entangled fibers 128 provide multidirectional improvements in conductivity, at least some advantages in uniformity of tensile properties and impact strength, and greater electrical uniformity (e.g., as compared to a unidirectional carbon fiber). Additionally, entanglement allows for the nanomaterials 112 to not just be sitting on the surface of the carrier sheet 108, but to be essentially intertwined with the carrier sheet 108. Being intertwined provides an advantage of plugging air gaps with conductive nanomaterials 112 (e.g., carbon nanomaterials 168), where if the nanomaterials 112 were just sitting on the surface of the carrier sheet 108, the mechanical integrity of the interface between the nanomaterial structure 110 (e.g., the nanomaterials 112) and the carrier sheet 108 would be weaker than if intertwined.

In an exemplary example, the carrier sheet 108 takes the form of a carbon fiber veil 122, and the fibers 128 are carbon fibers 118. Accordingly, the carbon fiber veil 122 includes carbon fibers 118 (e.g., a plurality of continuous strands of carbon fibers) that are randomly entangled or looped together to form a thin non-woven sheet, ply, or mat of carbon fibers. In certain example implementations, the carbon fibers 118 are held together with a light binder (not explicitly illustrated). As one example, the carbon fiber veil 122 is porous. As one example, the carbon fiber veil 122 is conductive.

Other non-limiting examples of the carrier material 120 include nylon (e.g., nylon fibers), polyester (e.g., polyester fibers), PEEK (e.g., PEEK fibers), PEKK (e.g., PEKK fibers), fiberglass (e.g., fiberglass fibers), carbon (e.g., carbon fibers, such as general purpose HexForce® carbon fibers from Hexcel® Corporation or TORAYCA™ carbon fibers from Toray Industries, Inc.), metallized polymer (e.g., metallized polymer fibers), metal meshes or foils (e.g., expanded copper foil), metalized carbon fiber (e.g., nickel coated carbon fiber), polyacrylonitrile (PAN) (e.g., PAN fibers), electrospun PAN nanofibers, tightly packed, wet-spun carbon nanotube threads and the like or a combination thereof.

Other non-limiting examples of the carrier material 120 include glass fibers (e.g., E-glass, S-glass), aramid fibers (e.g., Kevlar), fluoropolymer fibers (e.g., Ultra High Molecular Weight Polyethylene, High Density Polyethylene, Teflon, etc.) and the like or a combination thereof.

Still other non-limiting examples of the carrier material 120 include silicon carbide (e.g., silicon carbide fibers), alumina (e.g., alumina fibers), boron (e.g., boron fibers, such as boron fibers from Specialty Materials™), glass (e.g., glass fibers, such as general purpose HexForce® glass fibers from Hexcel® Corporation), aramid (e.g., aramid fibers, such as general purpose HexForce® aramid fibers from Hexcel® Corporation), hemp (e.g., hemp fibers), quartz (e.g., quartz fibers), ceramic (e.g., ceramic fibers), basalt (e.g., basalt fibers) and combinations or hybrids thereof (e.g., Hexcel HexForce® hybrid reinforcement fibers from Hexcel® Corporation.)

In another example, the carrier sheet 108 includes (e.g., is fabricated from) a dielectric carrier material 120 (e.g., a dielectric veil) (not explicitly illustrated). Non-limiting examples of the dielectric carrier material include Ultra High Molecular Weight Polyethylene (UHMWPE), fluoropolymers, polyimides, and the like or a combination thereof. A dielectric carrier sheet 108 provides some advantages in keeping a lightning strike at the surface, and help from allowing the current to get into the underlying composite structure 400.

In another example, the carrier sheet 108 includes (e.g., is fabricated from) a combination of the conductive carrier material 120 and the dielectric carrier material 120. The particular combination of the material system may be based on the application, the level of isolation desired or required, the level of conductivity desired or required, etc. for surface protection.

In one example, the carrier sheet 108 is porous. Thus, the carrier sheet 108 also serves as a filter (e.g., a filtering layer) for the nanomaterials 112. As one example, the carrier sheet 108 includes (e.g., is fabricated from) a porous nonwoven carrier material 120. As other examples, the carrier sheet 108 includes a porous veil, sheet, cloth, fabric or mat (e.g., a material having a plurality of apertures or openings) through which a slurry 508 (FIG. 4) of the carbon nanomaterials 226 is filtered. In an exemplary example, the slurry 508 is an aqueous solution of water and carbon nanotubes 172. By filtering the slurry 508 with the carrier sheet 108, the carbon nanotubes 172 are pulled from the aqueous solution in a uniform manner, and the water is pulled away from the end product. As will be described herein, after passing through a series of heaters and nip rollers for pressure, any of the residual water left over is driven off from the end product.

The particular carrier material 120 used for the carrier sheet 108 may depend, at least in part, on the particular application and/or function of the disclosed conductive pre-impregnated composite sheet 100, such as, but not limited to, electromagnetic interference (EMI) shielding, radiation shielding, ionizing radiation shielding, lightning protection, environmental protection, environmental isolation, scratch resistance, etc. As one example, when a higher conductivity of the conductive pre-impregnated composite sheet 100 is desired or required, for example, for lightning strike protection and/or low frequency shielding effectiveness, the carrier sheet 108 may be made from a conductive material, for example, the carbon fibers (e.g., the carbon fiber veil). As another example, when a lower conductivity of the conductive pre-impregnated composite sheet 100 is desired or required, the carrier sheet 108 may be made from a non-conductive material, for example, glass, aramid, and/or fluoropolymer fibers.

In one example, the carrier sheet 108 includes a metallic coating 124 (e.g., the carrier material 120 is coated with the metallic coating 124). The carrier sheet 108 including the metallic coating 124 may also be referred to as a metallic coated carrier sheet, a metalized carrier sheet, a metallic coated carrier material, a metalized carrier material, a metallic coated material layer, or a metalized material layer.

In an exemplary example, the metallic coating 124 is a nickel coating 126. The carrier sheet 108 including the nickel coating 126 may also be referred to as a nickel (Ni)-coated carrier layer, a Ni-metalized carrier layer, a Ni-coated carrier material, a Ni-metalized carrier material, a Ni coated material layer, or a Ni-metalized material layer. The nickel provides enhanced lightning strike protection and low frequency shielding effectiveness. The nanomaterials 112 (e.g., the carbon nanomaterials 170) provide low to high frequency shielding effectiveness. Together they provide enhanced lightning strike protection and broadband shielding effectiveness.

Thus, in an exemplary example, the carrier sheet 108 includes a Ni-coated nonwoven carbon fiber veil 122. The Ni-coated nonwoven carbon fiber veil 122 provides a backbone for attachment of the nanomaterials 112 (e.g., the carbon nanomaterials 170) to produce the conductive pre-impregnated composite sheet 100. The Ni-coated nonwoven carbon fiber veil 122 provides reinforcement and greater tensile and impact strength to the nanomaterial structure 110. Enhanced conductivity and low frequency shielding effectiveness (e.g., <1 GHz) is provided through the presence of nickel on the outer surface of the Ni-coated nonwoven carbon fiber veil 122. Enhanced lightning strike capability is provided through the presence of nickel on the surface of the individual carbon fibers 118 of the nonwoven carbon fiber veil 122.

In other example, other metals besides, or in addition to, nickel are used as the metallic coating 124. The particular metal used for the metallic coating 124 may be selected, for example, based on a desired shielding effectiveness.

In one example, the metallic coating 124 (e.g., the nickel coating 126) is applied to one surface of the carrier sheet 108. In another example, the metallic coating 124 (e.g., the nickel coating 126) is applied to both surfaces of the carrier sheet 108. In examples where the metallic coating 124 is applied to both surfaces of the carrier sheet 108, more of the metallic coating 124 may present on one surface than the other surface. In one example, when the nanomaterial composite sheet 104 (e.g., at least carrier sheet 108) includes the metallic coating 124, the surface of the carrier sheet 108 to which the nanomaterial structure 110 is bonded may be opposite to the surface of the carrier sheet 108 having more of the metallic coating 124.

In an exemplary implementation, individual carbon fibers 118 (e.g., carbon fiber tows) are coated with nickel in a continuous chemical vapor deposition process. After a spool of the carbon fiber 118 is coated (e.g., on all sides) with nickel, the Ni-coated carbon fiber 118 is chopped up and applied as the nonwoven veil (e.g., the Ni-coated nonwoven carbon fiber veil 122).

In another example, the carrier sheet 108 includes the carbon fiber veil 122 and the metallic coating 124 (e.g., the nickel coating 126). The carbon fiber veil 122 including the metallic coating 124 may also be referred to as a metallic coated carbon fiber veil or a metalized carbon fiber veil. The carbon fiber veil 122 including the nickel coating 126 may also be referred to as a Ni coated carbon fiber veil or a Ni-metalized carbon fiber veil.

The metallic coating 124 (e.g., nickel coating 126) may be applied to the carrier sheet 108 by a variety of known processes or techniques. As one example, the metallic coating 124 is applied to the carrier material 120 or individual ones of the fibers 128, for example, by a chemical vapor deposition process, an electroless plating process, or an electroplating process. In one example, nickel is applied to the carrier sheet 108 by a chemical vapor deposition process. In another example, nickel is applied to the carrier sheet 108 by an electroless nickel plating process. In yet another example, nickel is applied to carrier sheet by a nickel electroplating process.

In one example, the nanomaterial structure 110 includes the nanomaterials 112 bonded to a surface of the carrier sheet 108. The nanomaterials 112 may take various forms. As one general, non-limiting example, the nanomaterials 112 are (e.g., take the form of) nanoparticles 130 having various geometries. As one specific, non-limiting example, the nanomaterials 112 include (e.g., take the form of) nanotubes 132. As another specific, non-limiting example, the nanomaterials 112 include (or take the form of) nanospheres 134. As yet another specific, non-limiting example, the nanomaterials 112 include at least one of or a combination of the nanoparticles 130, the nanotubes 132 and/or the nanospheres 134.

As previously described, in one example, the nanomaterials 112 are carbon nanomaterials 168. As specific, non-limiting examples, the carbon nanomaterials 168 include (e.g., take the form of) carbon nanoparticles 170, carbon nanotubes 172, carbon nanospheres 174, graphene 136 (e.g., graphene sheets or flakes) or a combination of the carbon nanoparticles 170, the carbon nanotubes 172, the carbon nanospheres 174 and/or the graphene 136. In other examples, the carbon nanomaterials 168 include various other allotropes of carbon.

Referring specifically to the carbon nanotubes 172, as an exemplary example, the carbon nanotubes 172 are single wall carbon nanotubes (SWCNTs). As another example, the carbon nanotubes 172 are multiwall carbon nanotubes (MWCNTs). As another example, the carbon nanotubes 172 are prestressed multiwall carbon nanotubes (PSMWCNTs). As yet another example, the carbon nanotubes 172 are a combination of SWCNTs, MWCNTs, and/or PSMWCNTs.

PSMWCNTs may be made in accordance with known techniques. As one example, PSMWCNTs may be achieved by putting MWCNTs into a bomb chamber and using an explosion to rapidly increase the pressure to force the walls of the MWCNTs to compress to within a distance where van der Waals forces dominate. As one example, PSMWCNTs may be achieved by exposing MWCNTs to radiation to increase pressure.

In one particular, non-limiting example, PSMWCNTs may have an interwall spacing ranging from approximately 0.22 nm to approximately 0.28 nm (e.g., compared to approximately 0.34 nm for conventional MWCNTs). Benefits offered by PSMWCNTs may include enhanced interwall shear strengths, which in turn improve load-transfer capabilities compared to those of normal MWCNTs. This provides axial tensile strength and Young's modulus that are approximately 20 percent higher than those of normal carbon nanotubes (CNTs).

In another specific, non-limiting example, the nanomaterial structure 110 is a boron nanomaterial structure 178, and the nanomaterials 112 are boron nanomaterials 180. Accordingly, the boron nanomaterial structure 178 includes boron nanomaterials 180 bonded to the surface of carrier sheet 108. As examples (not explicitly illustrated), the boron nanomaterials 180 include (e.g., take the form of) boron nanoparticles, boron nanotubes, boron nanospheres, quasi-planar boron clusters, layered boron, quasi-crystalline boron solid particles or a combination thereof. The present disclosure recognizes that boron may be appropriate for neutron shielding both as a simple material and as a compound.

In another specific, non-limiting example, the nanomaterial structure 110 includes compounds, such as those including boron (e.g., boron nitride).

In still other general, non-limiting examples, the nanomaterial structure 110 include the nanomaterials 112 taking the form of other layered or van der Waals or lamellar nanomaterials including, for example, hexagonal boron nitride (hBN), molybdenum disulfide (MoS2), tungsten disulfide (WS2), boron nitride nanotubes and the like or a combination thereof.

In yet other examples, other nanomaterials 112 are used to form nanomaterial structure 110. The particular nanomaterials 112 used may be selected, for example, based on one or more of desired shielding effectiveness, desired electromagnetic performance characteristics and the like.

The density of the nanomaterials 112 built up to form the nanomaterial structure 110 on the carrier sheet 108 may depend upon various factors including, but not limited to, the size and/or geometry of the nanomaterials 112, the type of the nanomaterials 112, a particular application of the nanomaterial structure 110 (e.g., a desired shielding effectiveness or attenuation at particular RF frequencies, a desired level of lightning strike protection, a desired conductivity level, a desired surface resistivity, and the like), a desired thickness of the nanomaterial structure 110, a desired weight of the nanomaterial structure 110, and the like.

As one specific, non-limiting example, the nanomaterials 112 have a basis weight of approximately 1 gram per square meter (gsm). As one specific, non-limiting example, the nanomaterials 112 have a relative density of less than approximately 1.0.

In one example, the nanomaterial composite sheet 104 is a laminate, such that nanomaterial structure 110 is permanently bonded to carrier sheet 108. As one example, the nanomaterial structure 110 includes a randomly oriented, uniformly distributed structure of the nanomaterials 112 (e.g., the nanotubes 132).

As one specific, non-limiting example, the nanomaterial structure 110 (e.g., the carbon nanomaterial structure 164) has a basis weight of approximately 1 gram of the nanomaterial 112 (e.g., carbon nanomaterial 170) per square meter (gsm). As another specific, non-limiting example, the nanomaterial structure 110 (e.g., the carbon nanomaterial structure 164) has a basis weight of at least 1 gram of the nanomaterial 112 (e.g., carbon nanomaterial 170) per square meter (gsm).

The resin system 106 includes any suitable matrix material 140. The matrix material 140 provides a medium for binding and holding the fiber-reinforcing sheet 102 and the nanomaterial composite sheet 104 together into a continuous, solid form. As one example, the matrix material 140 includes resin 146, such as an epoxy resin, a polymer resin (e.g., thermoset, thermoplastic or rubber) and the like. As one example, the resin system 106 includes a one-component epoxy system, using a latent (e.g., low reactivity) curing agent (also referred to as a B-stages resin or epoxy). As another example, the resin system 106 includes a non-cured resin system. As yet another example, the resin system 106 also includes a suitable curing agent (not explicitly illustrated). Other types of resin systems 106 are also contemplated.

Figure 2:
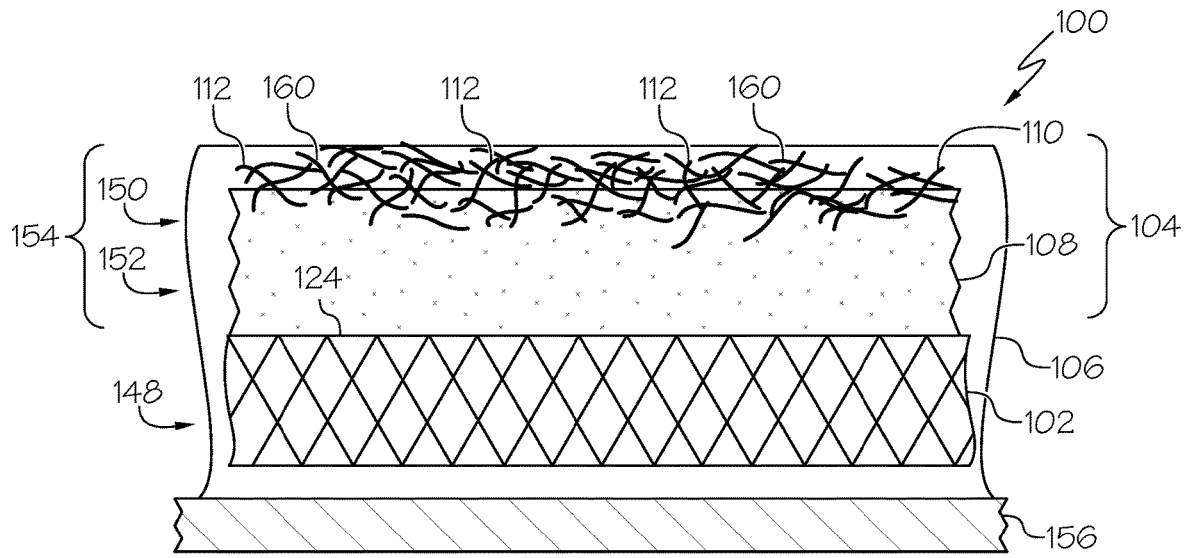
FIG. 2 is a partial schematic side elevation view, in section, of one example of the conductive pre-impregnated composite sheet.
Figure 3:
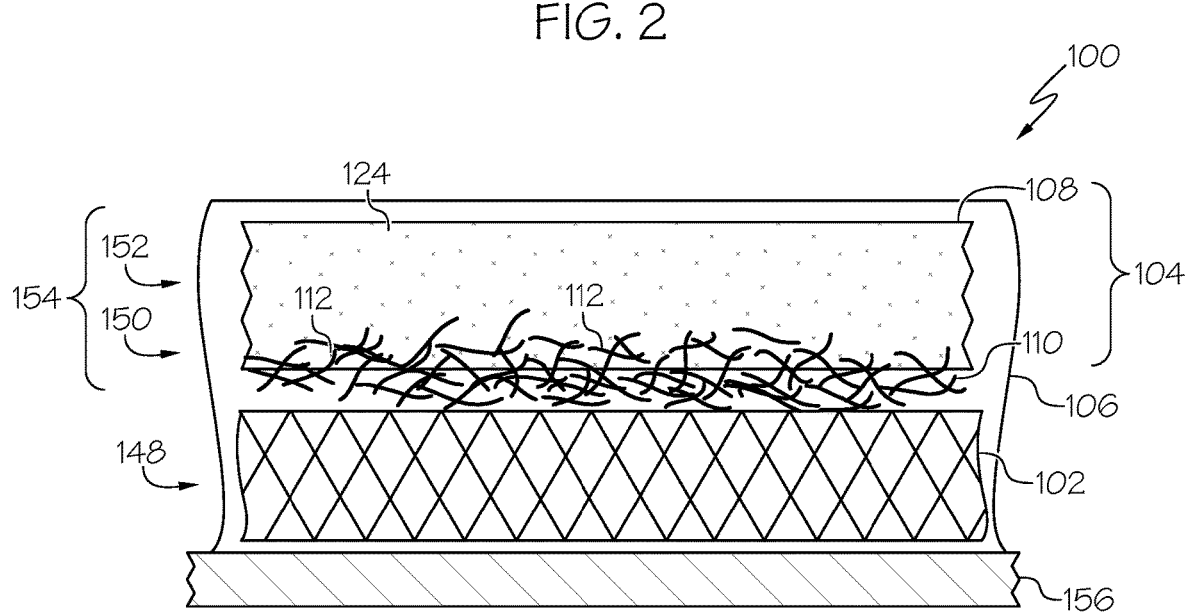
FIG. 3 is a partial schematic side elevation view, in section, of another example of the conductive pre-impregnated composite sheet.

Referring to FIGS. 2 and 3, and with reference to FIG. 1, in one example, the conductive pre-impregnated composite sheet 100 is a laminate including a plurality of material layers. The fiber-reinforcing sheet 102 forms (e.g., define) at least one layer (e.g., a fiber-reinforcing material layer 148). The nanomaterial structure 110 forms at least one layer (e.g., a nanomaterial layer 150, such as a carbon nanomaterial layer, a boron nanomaterial layer, etc.). The carrier sheet 108 forms at least one layer (e.g., a carrier material layer 152). Thus, as one example, the nanomaterial composite sheet 104 forms a combination layer (e.g., a nanomaterial composite material layer 154, such as a carbon nanomaterial composite material layer, a boron nanomaterial composite material layer, etc.) made up of the nanomaterial layer 150 and the carrier material layer 152. While only a single fiber-reinforcing material layer 148 is illustrated in the examples of FIGS. 2 and 3, in other examples, the conductive pre-impregnated composite sheet 100 includes additional fiber-reinforcing material layers (not explicitly illustrated).

Depending upon the type and/or geometry of the nano materials 112 (e.g., the nanotubes 132, the nanospheres 134, the nanoparticles 130, etc.), the size of the nanomaterials 112 may vary. As one specific, non-limiting example, the nanotubes 132 have an extremely high aspect ratio (length to diameter ratio), for example, of at least 2,500:1. As one example, the nanotubes 132 have a length ranging from approximately 0.5 millimeter to approximately 4 millimeters and a diameter ranging from approximately 1 nanometer to approximately 50 nanometers. Other suitable dimensions of the nanomaterials 112 are also contemplated.

Due to the small size of the nanomaterials 112, at least some the nanomaterials 112 may at least partially disperse and integrate throughout the carrier sheet 108. As one example, at least some of the nanomaterials 112 penetrate and intersperse at least partially through a thickness (e.g., a through-thickness) (not explicitly identified) of the carrier sheet 108 and entangle and integrate with the carrier sheet 108. Accordingly, the nanomaterial structure 110 is effectively coupled to the carrier sheet 108.

In one example, the nanomaterials 112 are concentrated proximate to (e.g., at or near) the surface of the carrier sheet 108. As another example, the nanomaterials 112 are partially interspersed and entangled throughout the thickness of the carrier sheet 108. As yet another example, the nanomaterials 112 are completely interspersed and entangled throughout the thickness of the carrier sheet 108.

Thus, as one example, and as illustrated in FIGS. 2 and 3, at least some of nanomaterials 112 are interspersed through the thickness of the carrier sheet 108 and entangled with the carrier sheet 108 to bond (e.g., permanently bond) the nanomaterial structure 110 to the carrier sheet 108. Accordingly, as one example, the nanomaterial structure 110 is (e.g., takes the form of) a sheet structure that includes an entangled network of the nanomaterials 112 (e.g., a carbon nanoparticle structure including an entangled network of the nanoparticles 130, a carbon nanotube structure including an entangled network of the nanotubes 132, a carbon nanosphere structure including an entangled network of the nanospheres 134, and a graphene structure including a multi-platelet or multi-layered network of the graphene 136). As one example, the nanomaterials 112 are randomly distributed or oriented on the surface of the carrier sheet 108. As another example, the nanomaterials 112 are uniformly distributed or oriented on the surface of carrier sheet 108.

In one example, entanglement between the nanomaterials 112 occurs at various crossover locations 160 between different ones of the nanomaterials 112. The network of entangled nanomaterials 112 includes a sufficient amount of the nanomaterials 112 to provide a sufficient number of crossover locations 160 to achieve a stable nanomaterial structure 110.

In one example, and as illustrated in FIG. 2, the nanomaterial composite sheet 104 is oriented such that the carrier sheet 108 is adjacent to (e.g., in contact with) the fiber-reinforcing sheet 102 and the nanomaterial structure 110 is opposite the fiber-reinforcing sheet 102. As such, the nanomaterial structure 110 defines one exterior surface of the conductive pre-impregnated composite sheet 100.

As another example, and as illustrated in FIG. 3, the nanomaterial composite sheet 104 is oriented such that the nanomaterial structure 110 is adjacent to (e.g., in contact with) the fiber-reinforcing sheet 102 and the carrier sheet 108 is opposite the fiber-reinforcing sheet 102. As such, when the nanomaterial composite sheet 104 (e.g., the carrier sheet 108) includes the metallic coating 124 (e.g., the nickel coating 126), the surface of the carrier sheet 108 having the metallic coating 124 defines one exterior surface of the conductive pre-impregnated composite sheet 100.

The orientation of the nanomaterial composite sheet 104 relative to the fiber-reinforcing sheet 102 may depend on various factors, such as the desired mechanical and/or electrical properties of conductive pre-impregnated composite sheet 100. As one example, when lightning strike protection is the primary purpose, the nanomaterial composite sheet 104 may be oriented such that the metallic coating 124 is on (e.g., defines) the exterior surface of the conductive pre-impregnated composite sheet 100 (FIG. 3). As another example, when EMI shielding is the primary purpose, the nanomaterial composite sheet 104 may be oriented such that the nanomaterial structure 110 is on (e.g., defines) the exterior surface of the conductive pre-impregnated composite sheet 100 (FIG. 2).

In one example, and as illustrated in FIG. 3, when the nanomaterial composite sheet 104 is oriented such that the nanomaterial structure 110 is adjacent to (e.g., in contact with) the fiber-reinforcing sheet 102, the nanomaterials 112 forming the nanomaterial structure 110 is concentrated between the carrier sheet 108 and the fiber-reinforcing sheet 102. In another example, at least some of the nanomaterials 112 are at least partially interspersed though and entangled with the fiber-reinforcing sheet 102 to bond (e.g., permanently bond) the nanomaterial structure 110 to the fiber-reinforcing sheet 102.

Figure 4:
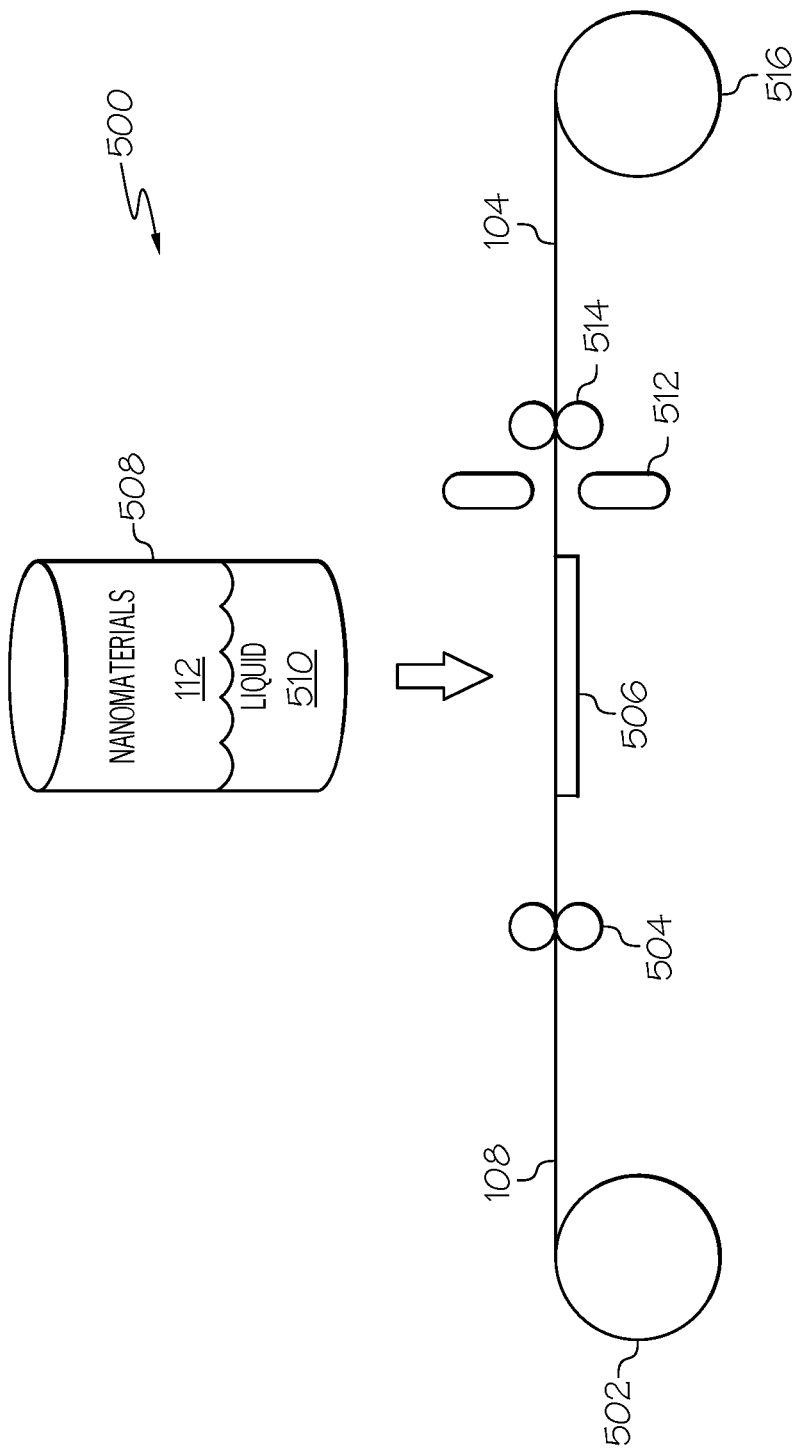
FIG. 4 is a schematic block diagram of one example of a system for making a nanomaterial composite sheet.

Referring to FIG. 4, one example of a system 500 for making the nanomaterial composite sheet 104 is disclosed. In one example, the nanomaterial composite sheet 104 is made by overlaying the slurry 508 of the nanomaterials 112 (e.g., the carbon nanomaterials 168, the boron nanomaterials 180, etc.) and a liquid 510 onto the surface of the carrier sheet 108. The slurry 508 is at least partially filtered through the carrier sheet 108 to build the nanomaterial structure 110 on the surface of the carrier sheet 108. In one example, at least one of pressure and/or heat is applied to the combination to bond the nanomaterial structure 110 (e.g., the nanomaterials 112) and the carrier sheet 108 together to form the nanomaterial composite sheet 104.

In one example, the system 500 includes a roll of the carrier sheet 108 (generally referred to herein as a roll 502). A pair of first rollers 504 pulls the carrier sheet 108 off of the roll 502 and direct or guide the carrier sheet 108 along a processing path. As examples, the first rollers 504 are guide rollers, nip rollers, pinch rollers or the like.

In one example, the nanomaterials 112 and the liquid 510 are mixed to form the slurry 508 of the nanomaterials 112 and the liquid 510 (e.g., a fluid mixture or suspension of the nanomaterials 112 suspended in the liquid 510). The liquid 510 may be any suitable dispersive liquid or fluid carrier material into which the nanomaterials 112 are dispersed and suspended. Generally, as one example, the liquid 510 is non-reactive with the nanomaterials 112 (e.g., the nanomaterials 112 are insoluble in the liquid 510). As an exemplary example, the liquid 510 is water. As other examples, the liquid 510 is an organic solvent, an acid, a resin (e.g., a thermoplastic or epoxy resin) or any other suitable dispersive liquid. In other examples, the liquid 510 also includes one or more compounds for improving and/or stabilizing the dispersion and suspension of the nanomaterials 112 in the liquid 510.

Various known chemical processes may be used to create the nanomaterials 112. For example, various types of the nanotubes 132 (e.g., the carbon nanotubes 172, the boron nanotubes, etc.), manufactured in accordance with known techniques, may be used as the nanomaterials 112. In one example, the nanotubes 132 are grown on a sheet (e.g., a stainless steel sheet). The grown nanotubes 132 are then be scraped away from the sheet.

In one example, the system 500 includes a forming table 506. Interaction between the nanomaterials 112 and the carrier sheet 108 to build the nanomaterial structure 110 occurs on the forming table 506. As one example, the forming table 506 includes a wire mesh or screen sufficient to support the carrier sheet 108 when the slurry 508 is dispensed (e.g., poured, sprayed, etc.) over the carrier sheet 108. As the slurry 508 is overlaid (e.g., poured) over the carrier sheet 108, the slurry 508 spreads out over the surface of the carrier sheet 108. The liquid 510 passes through the carrier sheet 108 and the nanomaterials 112 are filtered (e.g., sifted out and retained) by the carrier sheet 108 (e.g., on and/or at least partially below the surface of the carrier sheet 108) to form the nanomaterial structure 110.

In an exemplary example, the carrier sheet 108 is supported on a conveyer (e.g., a conveyor belt) (not explicitly illustrated), which carries the carrier sheet 108 along the processing path. The conveyor may be a wire mesh or screen sufficient to support the carrier sheet 108 in a plane as the slurry 508 is dispensed over and filtered by the carrier sheet 108.

In one example, the system 500 also includes a vacuum zone (not explicitly illustrated) proximate to (e.g., below) the forming table 506 configured to provide a vacuum pressure sufficient to draw the slurry 508 from above (e.g., from an upper surface of) the carrier sheet 108 and through the carrier sheet 108, while allowing the nanomaterials 112 to entangle upon the surface and settle into (e.g., at least partially disperse through) the carrier sheet 108.

In one example, the system 500 includes one or more dryers 512 (e.g., to apply heat) and/or one or more second rollers 514 (e.g., to apply pressure or pressure and heat). The dryers 512 are located proximate to (e.g., at or near) the coupled combination of the nanomaterial structure 110 and the carrier sheet 108 along the processing path following the forming table 506. As one example, the dryers 512 are configured to dry the coupled combination of the nanomaterial structure 110 and the carrier sheet 108 (e.g., remove most or all of the remaining liquid 510) and form the nanomaterial composite sheet 104.

As one example, the second rollers 514 are configured to pull, direct or guide the coupled combination of the nanomaterial structure 110 and the carrier sheet 108 along the processing path. The second rollers 514 are also configured to compress the coupled combination of the nanomaterial structure 110 and the carrier sheet 108 to form the nanomaterial composite sheet 104. As examples, the second rollers 514 are guide rollers, nip rollers, pinch rollers or the like.

As one example, the second rollers 514 are heated rollers configured to increase the temperature of the coupled combination of the nanomaterial structure 110 and the carrier sheet 108, for example, to dry the coupled combination of the nanomaterial structure 110 and the carrier sheet 108 while the coupled combination of the nanomaterial structure 110 and the carrier sheet 108 is being compressed by the second rollers 514. While only a single opposed pair of the second rollers 514 is illustrated in the example of FIG. 4, in other examples, additional pairs of rollers are disposed along the processing path to incrementally compress (e.g., by between approximately 0.5 mil to approximately 1.0 mil) the coupled combination of the nanomaterial structure 110 and the carrier sheet 108, for example, in multiple stages.

In an exemplary example implementation, the coupled combination of the nanomaterial structure 110 and the carrier sheet 108 are heated to between approximately 200° F. and approximately 300° F. (e.g., 220° F.) to remove the liquid 510 and/or dry the nanomaterial composite sheet 104 (e.g., form a dry nanomaterial composite sheet).

In an exemplary example implementation, the coupled combination of the nanomaterial structure 110 and the carrier sheet 108 is (e.g., after being heated) compressed from a thickness of approximately 8 mils to form the nanomaterial composite sheet 104 having a thickness of approximately 6 mils (e.g., 6.3 mils) (e.g., a compressed nanomaterial composite sheet). Applying heat, pressure, or a combination of heat and pressure bonds and/or integrates the nanomaterial structure 110 and the carrier sheet 108 together. As one example, the applied pressure and/or heat is uniform and aids in creating the nanomaterial composite sheet 104 that is uniform and unitary (e.g., a uniform and unitary nanomaterial composite sheet).

Applying at least one of pressure and/or heat to the combination of the nanomaterial structure 110 and the carrier sheet 108 may also be referred to as laminating. As one example, applying pressure and/or heat to the combination of the nanomaterial structure 110 and the carrier sheet 108 further intersperses and integrates the nanomaterials 112 with the carrier sheet 108, for example, to bond the nanomaterial structure 110 and the carrier sheet 108 together.

Following the application of pressure and/or heat (e.g., the applying step), nanomaterial composite sheet 104 may be rolled into a roll of nanomaterial composite sheet 104 (generally referred to herein as roll 516).

Referring to FIGS. 2 and 3, and with reference to FIG. 1, in one example, the conductive pre-impregnated composite sheet 100 includes a protective sheet 156. As one example, the protective sheet 156 is releasably coupled to the fiber-reinforcing sheet 102 opposite the nanomaterial composite sheet 104. The protective sheet 156 may protect the conductive pre-impregnated composite sheet 100, for example, when rolled. Generally, the protective sheet 156 is removed from the conductive pre-impregnated composite sheet 100 prior to use of the conductive pre-impregnated composite sheet 100 in a particular application, for example, when used to make the composite structure 400 (FIG. 11). The protective sheet 156 may also be referred to as a protective layer or a release film. As examples, the protective sheet 156 includes (e.g., takes the form of) a sheet of a polytetrafluoroethylene glass material, such as ARMALON™ polytetrafluoroethylene glass laminate, paper, a polyester film, a sheet of polyethylene terephthalate (PET) (e.g., MYLAR®) and the like.

Figure 6:
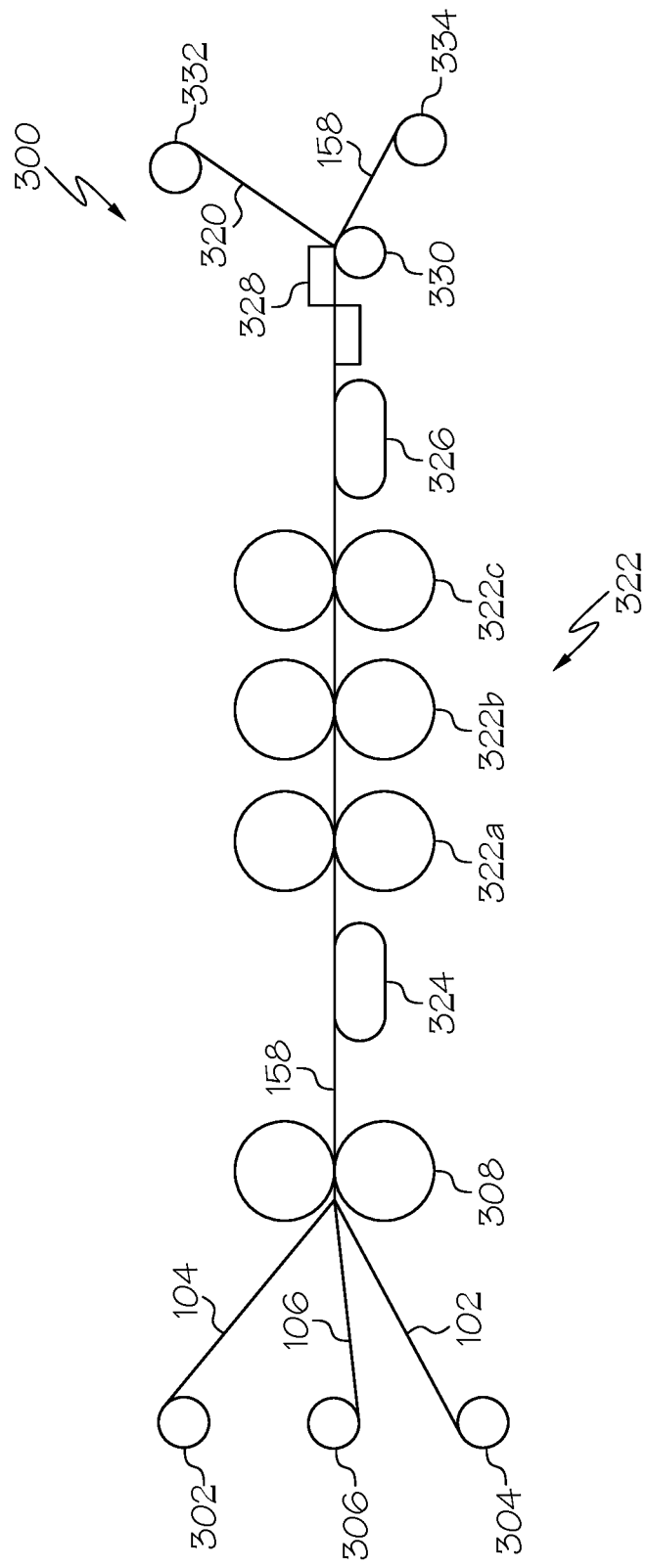
FIG. 6 is a schematic block diagram of one example of the disclosed system for making the conductive pre-impregnated composite sheet.

Referring to FIG. 5, one example of a method 200 is disclosed. The method 200 is one example implementation of the disclosed method for making the conductive pre-impregnated composite sheet 100 (FIG. 1). As illustrated in FIG. 6, a system 300 is one example implementation of the disclosed system for making the conductive pre-impregnated composite sheet 100, for example, according to the method 200. Modifications, additions, or omissions may be made to the method 200 without departing from the scope of the present disclosure. The method 200 may include more, fewer, or other steps. Additionally, steps may be performed in any suitable order.

Referring to FIG. 5, in one example, the method 200 includes the step of providing the nanomaterial composite sheet 104 (e.g., the carbon nanomaterial composite sheet 162, the boron nanomaterial composite sheet 176, etc.), as shown at block 202.

In one example, the method 200 includes the step of providing the fiber-reinforcing sheet 102, as shown at block 204.

In one example, the method 200 includes the step of providing the resin system 106, as shown at block 206.

In one example, the method 200 includes the step of joining the nanomaterial composite sheet 104, the fiber-reinforcing sheet 102 and the resin system 106 to form a combined sheet 158, as shown at block 208.

Referring to FIG. 6, and with reference to FIG. 5, in one example, the system 300 includes pair of joining rollers 308. In one example, the step of joining the nanomaterial composite sheet 104, the fiber-reinforcing sheet 102 and the resin system 106 to form the combined sheet 158 (block 208) includes passing the nanomaterial composite sheet 104, the fiber-reinforcing sheet 102 and the resin system 106 through the pair of joining rollers 308. As examples, the pair of joining rollers 308 (e.g., each joining roller) includes nip rollers, pinch rollers, pressure rollers or the like. The pair of joining rollers 308 is configured to apply a first compression force F1 (e.g., a high pressure) to the nanomaterial composite sheet 104, the fiber-reinforcing sheet 102 and the resin system 106 to form the combined sheet 158. As one example, the pair of joining rollers 308 includes powered rollers that press the nanomaterial composite sheet 104, the fiber-reinforcing sheet 102 and the resin system 106 together to form a laminated product. Thus, as one example, the combined sheet 158 is a laminate.

In one example, the pair of joining rollers 308 is spaced apart by a first distance D1. As an exemplary example, the first distance D1 between joining rollers 308 is between approximately 16 mils (0.40 mm) and approximately 18 mils (0.45 mm). As another example, the first distance D1 between joining rollers 308 is between approximately 14 mils (0.36 mm) and approximately 20 mils (0.51 mm). A first compression force F1 is created as the nanomaterial composite sheet 104, the fiber-reinforcing sheet 102 and the resin system 106 pass between the pair of joining rollers 308. A high pressure is created at a nip point (illustrated, but not explicitly identified) between the pair of joining rollers 308. The nip point of the pair of joining rollers 308 is the point of convergence between the joining rollers 308. The high pressure created by the pair of joining rollers 308 (at the nip point) brings the nanomaterial composite sheet 104, the fiber-reinforcing sheet 102 and the resin system 106 into intimate contact, and can also squeeze out any bubbles or blisters that might cause a defective bond. In other examples, other first distances D1 between the joining rollers 308 are be used. The particular first distance D1 used may be selected, for example, based on the materials used for the nanomaterial composite sheet 104, the fiber-reinforcing sheet 102 and/or the resin system 106, the particular first compression force F1 desired and the like.

The pressure being applied by first compression force F1 is set by a distance between the joining rollers 308 (distance D1) suitable to join the nanomaterial composite sheet 104, fiber-reinforcing sheet 102 and the resin system 106 (e.g., put each in intimate contact). The applied pressure begins initial lamination of the nanomaterial composite sheet 104, fiber-reinforcing sheet 102 and the resin system 106. As described herein below, heat is applied, which then starts the ability for the resin system 106 to flow and impregnate the nanomaterial composite sheet 104 and the fiber-reinforcing sheet 102.

In other examples, the step of joining the nanomaterial composite sheet 104, the fiber-reinforcing sheet 102 and/or the resin system 106 to form the combined sheet 158 (block 208) may include chemical vapor deposition (CVD) or physical vapor deposition (PVD) of the nanomaterials 112 onto the carrier sheet 108, hot drape forming of the nanomaterial structure 110 onto the carrier sheet 108, compression molding of the nanomaterial structure 110 (e.g., the nanomaterials 112) with the carrier sheet 108 and the like.

Referring to FIG. 5, in one example, the method 200 includes the step heating the combined sheet 158, as shown at block 210. Heating the combined sheet 158 may reduce the viscosity of the resin system 106 in order to prepare the resin system 106 to be integrated throughout the nanomaterial composite sheet 104 and the fiber-reinforcing sheet 102.

Referring to FIG. 6, and with reference to FIG. 5, in one example, the system 300 includes a heat plate 324. In one example, the step of heating the combined sheet 158 (block 210) includes passing the combined sheet 158 over the heat plate 324. The heat plate 324 is located proximate to the combined sheet 158 along a travel path of the combined sheet 158 (e.g., below the combined sheet 158). As one example, the heat plate 324 includes a conductive surface that makes contact with the combined sheet 158. The heat plate 324 may increase the temperature of the combined sheet 158 to a temperature sufficient to get the resin 146 (FIG. 1) of the resin system 106 to flow (e.g., to wet the resin system 106). The combined sheet 158 (e.g., the nanomaterial composite sheet 104, fiber-reinforcing sheet 102 and the resin system 106) are heated to a point where the resin system 106 (e.g., the resin 146 from one or more resin films 144) begins to flow, and is brought to a viscosity that allows for impregnation of the nanomaterial composite sheet 104 and the fiber-reinforcing sheet 102 to begin.

As an exemplary example, the heat plate 324 includes an operating temperature of between approximately 200° F. and approximately 300° F. As other examples, other operating temperatures of heat plate 324 are also used. The particular operating temperatures of the heat plate 324 used may be selected, for example, based on the materials used for the nanomaterial composite sheet 104, the fiber-reinforcing sheet 102 and/or the resin system 106.

Referring to FIG. 5, in one example, the method 200 includes the step of compacting the combined sheet 158, as shown at block 212. Compacting the combined sheet 158 integrates the resin system 106 throughout the nanomaterial composite sheet 104 and the fiber-reinforcing sheet 102 (e.g., forces the resin 146 through the nanomaterial composite sheet 104 and the fiber-reinforcing sheet 102).

Referring to FIG. 6, and with reference to FIG. 5, in one example, the system 300 includes pairs of compacting rollers 322 (e.g., plurality of pairs of compacting rollers). In one example, the step of compacting the combined sheet 158 (block 212) includes passing the combined sheet 158 through a sequential series of the pairs of compacting rollers 322. As examples, each pair of the compacting rollers 322 (e.g., each compacting roller) includes nip rollers, pinch rollers, pressure rollers or the like. As one example, each pair of the compacting rollers 322 includes powered rollers that presses the combined sheet 158 together.

Each pair of the compacting rollers 322 is configured to apply a successively increasing compression force (e.g., a high pressure) to the combined sheet 158 created by a successively decreasing a distance between each successive (e.g., downstream) pair of the compacting rollers 322. The pairs of compacting rollers 322 apply pressure (e.g., progressively greater pressures) to force impregnation of the nanomaterial composite sheet 104 and the fiber-reinforcing sheet 102 with the resin system 106. The pressure (e.g., compression forces F2, F3, F4) applied by the pairs of compacting rollers 322 squeezes the resin system 106 (e.g., the resin 146) throughout the nanomaterial composite sheet 104 and the fiber-reinforcing sheet 102 and, thus, produces an integrated conductive pre-impregnated composite sheet 100.

As an exemplary example, each successive one of the plurality of pairs of compacting rollers 322 decreases the distance between the compacting rollers by approximately 0.5 mil (0.01 mm) from the preceding one of the plurality of pairs of compacting rollers 322. As another example, each successive one of the plurality of pairs of compacting rollers 322 decreases the distance between compacting rollers (e.g., associated pair of contacting rollers) by between approximately 0.25 mil (0.006 mm) and approximately 1 mil (0.025 mm) from a preceding one of the plurality of pairs of compacting rollers 322.

In one example, a first pair of compacting rollers 322a is spaced apart by a second distance D2. As an exemplary example, the second distance D2 between first compacting rollers 322a is between approximately 16 mils (0.40 mm) and approximately 17 mils (0.43 mm). As another example, the second distance D2 between first compacting rollers 322a is between approximately 14 mils (0.36 mm) and approximately 19 mils (0.48 mm). A second compression force F2 is created as the combined sheet 158 passes between the first pair of compacting rollers 322a. A high pressure is created at a nip point (illustrated, but not explicitly identified) between the first pair of compacting rollers 322a. The nip point of the first pair of compacting rollers 322 is the point of convergence between the first compacting rollers 322a. The high pressure created by the first pair of compacting rollers 322a (at the nip point) compresses the combined sheet 158. As other examples, other second distances D2 between the compacting rollers 322a are also used. The particular second distance D2 used may be selected, for example, based on the materials used for the nanomaterial composite sheet 104, the fiber-reinforcing sheet 102 and/or the resin system 106, the particular second compression force F2 desired and the like.

In one example, a second pair of compacting rollers 322b is spaced apart by a third distance D3. As an exemplary example, the third distance D3 between second compacting rollers 322b is between approximately 15.5 mils (0.39 mm) and approximately 16.5 mils (0.42 mm). As another example, the third distance D3 between second compacting rollers is between approximately 13.5 mils (0.34 mm) and approximately 18.5 mils (0.47 mm). A third compression force F3 is created as the combined sheet 158 passes between the second pair of compacting rollers 322b. A high pressure is created at a nip point (illustrated, but not explicitly identified) between the second pair of compacting rollers 322b. The nip point of the first pair of compacting rollers 322b is the point of convergence between the second compacting rollers 322b. The high pressure created by the second pair of compacting rollers 322a (at the nip point) further compresses the combined sheet 158. As other examples, other third distances D3 between the second compacting rollers 322b are also used. The particular second distance D2 used may be selected, for example, based on the materials used for the nanomaterial composite sheet 104, the fiber-reinforcing sheet 102 and/or the resin system 106, the particular third compression force F3 desired and the like.

In one example, a third pair of compacting rollers 322c is spaced apart by a fourth distance D4. As an exemplary example, the fourth distance D4 between the third compacting rollers 322c is between approximately 15 mils (0.38 mm) and approximately 16 mils (0.41 mm). As another example, the fourth distance D4 between the third compacting rollers 322c is between approximately 13 mils (0.33 mm) and approximately 18 mils (0.46 mm). A fourth compression force F4 is created as the combined sheet 158 passes between the third pair of compacting rollers 322c. A high pressure created at a nip point (illustrated, but not explicitly identified) between the third pair of compacting rollers 322c. The nip point of the third pair of compacting rollers 322c is the point of convergence between the third compacting rollers 322c. The high pressure created by the third pair of compacting rollers 322c (at the nip point) even further compresses combined sheet 158. As other examples, other third distances D3 between the third compacting rollers 322c are also used. The particular third distance D3 used may be selected, for example, based on the materials used for the nanomaterial composite sheet 104, the fiber-reinforcing sheet 102 and/or the resin system 106, the particular fourth compression force F4 desired and the like.

Referring to FIG. 5, in one example, the method 200 includes the step cooling the combined sheet 158, as shown at block 214. Cooling the combined sheet 158 sets the resin system 106.

Referring to FIG. 6, and with reference to FIG. 5, in one example, the system 300 includes a cold plate 326. In one example, the step of cooling the combined sheet 158 (block 214) includes passing the combined sheet 158 over the cold plate 326. The cold plate 326 is located proximate to the combined sheet 158 along the travel path of the combined sheet 158 (e.g., below the combined sheet 158). As one example, the cold plate 326 includes a conductive surface that makes contact with the combined sheet 158. The cold plate 326 may decrease the temperature of the combined sheet 158 to a temperature sufficient to set (e.g., partially cure) the resin 146 (FIG. 1) of the resin system 106. The combined sheet 158 (e.g., the nanomaterial composite sheet 104, fiber-reinforcing sheet 102 and the integrated resin system 106) are cooled to a point where a flow of the resin system 106 (e.g., the resin 146 from one or more resin films 144) is inhibited and, thus, producing the conductive pre-impregnated composite sheet 100, which may then be applied to the manufacturing process of the composite structure 400 (FIG. 11).

As an exemplary example, the cold plate 326 includes an operating temperature of between approximately 55° F. and approximately 60° F. As other examples, other operating temperatures of the cold plate 326 are also used. The particular operating temperatures of the cold plate 326 used may be selected, for example, based on the materials used for the nanomaterial composite sheet 104, the fiber-reinforcing sheet 102 and/or the resin system 106.

Referring to FIG. 5, in one example, the method 200 includes the step of trimming the combined sheet 158, as shown at block 216. Trimming the combined sheet 158 allows the size of the end size of the conductive pre-impregnated composite sheet 100 to be tailored for one or more particular applications, such as use with the composite structure 400 (FIG. 11).

Referring to FIG. 6, and with reference to FIG. 5, in one example, the system 300 includes a cutter 328 (e.g., at least one cutter). In one example, the step of trimming the combined sheet 158 (block 216) includes cutting or slitting the combined sheet 158 with the cutter 328 to a predetermined (e.g., desired) width.

Referring to FIG. 6, in one example, the system 300 includes a tensioner 330. The tensioner 330 is configured to pull the nanomaterial composite sheet 104, the fiber-reinforcing sheet 102 and the resin system 106 from corresponding supply reels and move the combined sheet 158 along the travel path. As one example, the tensioner 330 is configured to apply between approximately 30 lbs and approximately 50 lbs of force to the combined sheet 158. In one example, the tensioner 330 is also configured to control a feed rate of the combined sheet 158 along the travel path. As one example, the tensioner 330 moves the combined sheet 158 at a feed rate of less than approximately 5 ft/min. As another example, the tensioner 330 moves the combined sheet 158 at a feed rate of between approximately 1 ft/min and approximately 3 ft/min. As another example, the tensioner 330 moves the combined sheet 158 at a feed rate of between approximately 1 ft/min and approximately 2 ft/min. As yet another example, the tensioner 330 moves the combined sheet 158 at a feed rate of approximately 1 ft/min. The speed or feed rate of the entire line may tailorable to the product being produced and application.

Referring to FIG. 6, and with reference to FIGS. 7-10, the nanomaterial composite sheet 104, the fiber-reinforcing sheet 102 and the resin system 106 may be provided in various ways and/or in various forms. As one example, the system 300 includes a nanomaterial composite sheet-supply reel 302, such as a roll of continuous nanomaterial composite sheet 104 (e.g., a carbon nanomaterial composite sheet-supply reel, a boron nanomaterial composite sheet-supply reel, etc.). As one example, the system 300 also includes a fiber-reinforcing sheet-supply reel 304 (e.g., a roll of continuous fiber-reinforcing sheet 102). As one example, the system 300 also includes a resin system-supply reel 306 (e.g., a roll of continuous resin film 144). Generally, as used here, "continuous" means an elongated sheet having a length that is orders of magnitude greater than a width.

In one example, the nanomaterial composite sheet 104, the fiber-reinforcing sheet 102 and the resin system 106 are provided as separate material components. In another example, the resin system 106 is at least partially integrated with at least one of the nanomaterial composite sheet 104 and/or the fiber-reinforcing sheet 102.

Figure 7:
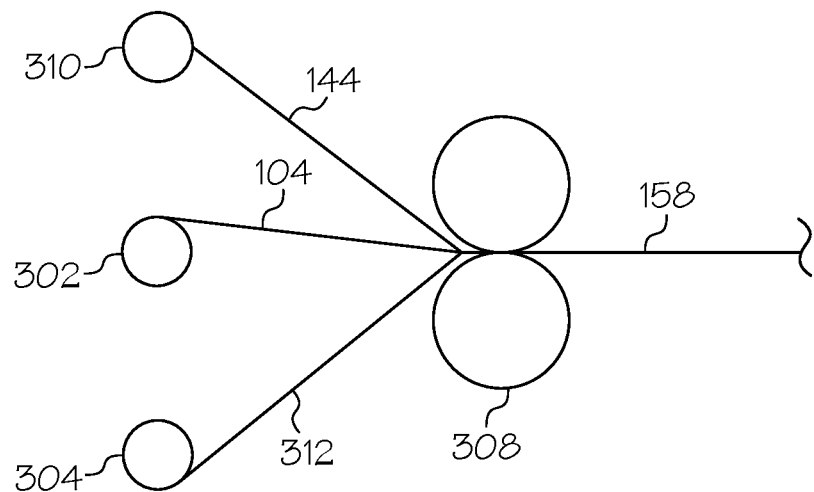
FIG. 7 is a partial schematic block diagram of one example of an input material configuration for the system of FIG. 6.

FIG. 7 illustrates one example material configuration of the resin film 144, the nanomaterial composite sheet 104 and the fiber-reinforcing sheet 102, for example, as passing through the pair of joining rollers 308.

In one example, the resin system 106 is at least partially formed by a resin film 144. As one example, the resin film 144 is provided, for example, from a resin film-supply reel 310. As one specific, non-limiting example, the resin film 144 is an epoxy resin system, such as Cycom® 977-3 epoxy resin from Cytec Industries, Inc. of Woodland Park, N.J. As one example, the resin film 144 includes a basis weight of between approximately 45 grams per square meter (gsm) and approximately 55 gsm. The content of resin 146 (FIG. 1) from resin film 144 may be tailorable based on need and/or the specific resin used.

In other examples, various other resin materials are used for the resin system 106, for example, other aerospace resins and automotive resins, including both thermoset and thermoplastic. Non-limiting examples of such resin materials include Cycom 5320-1, Torayca 3900-2, HexPly M21, HexPly M73, HexPly 8552, Cycom 970, Cycom 985, Cycom 1808, Cycom HST-7, P2Si 635LM, P2Si 700LM, Cetex TC 1100, Cetex TC 1000, Cetex TC 1200, Cetex TC 925-FST, Cetex TC910, TenCate RS-50, TenCate E731, TenCate TC275-1, BTCy-2, BTCy-1A, TenCate TC420, TenCate EX-1522, TenCate TC250, TenCate BT250E-1 and the like or combinations thereof.

In one example, the nanomaterial composite sheet 104 is provided, for example, from a nanomaterial composite sheet-supply reel 302. As one example, the nanomaterial composite sheet 104 includes a basis weight of between approximately 65 gsm and approximately 85 gsm.

In one example, at least a portion of the resin system 106 is integrated with the fiber-reinforcing sheet 102. Thus, the fiber-reinforcing sheet 102 may be pre-impregnated with the resin 146 (identified herein as a pre-impregnated fiber-reinforcing sheet 312). In one example, the pre-impregnated fiber-reinforcing sheet 312 is provided, for example, from a fiber-reinforcing sheet-supply reel 304. As one specific, non-limiting example, the pre-impregnated fiber-reinforcing sheet 312 is an epoxy/carbon fiber prepreg, such as IM7/Cycom 977-3 pre-preg material. As one example, the pre-impregnated fiber-reinforcing sheet 312 includes a basis weight of between approximately 190 gsm and approximately 220 gsm. In one example, the resin 146 makes up between approximately 35 percent and approximately 50 percent by weight of the pre-impregnated fiber-reinforcing sheet 312. The content of resin 146 in the pre-impregnated fiber-reinforcing sheet 312 may be tailorable based on need.

In other examples, various other fiber materials or fiber-reinforcing materials are used for the fiber-reinforcing sheet 102, for example, other aerospace fibers or fiber-reinforcing material and automotive fibers or fiber-reinforcing material. Non-limiting examples of such fiber-reinforcing material include IM7, IM8, IMS60, IMS65, AS4, AS4A, AS4C, AS4D, AS7, IM2A, IM2C, IM6, IM9, IM10, HM63, UTS50, ITS50, HTS45, STS40, HTA40, HTS40 MC, UMS40, UMS45, E-glass, S-glass, 7781 fiberglass, 4581 quartz, T300, T300J, T400H, T650, T700S, T700G, T800H, T800S, T1000G, M305, M30G, M35J, M40, M40J, M46J, M50J, M55J, M60J, IMA, Kevlar, UHMWPE, Spectra, Dyneema, Zoltek PX35, Zoltek PX30, Zoltek OX and the like or combinations thereof.

While not explicitly illustrated in FIG. 7, in another example, the resin film 144 and the nanomaterial composite sheet 104 are combined to form a laminate, for example, coupled together by a pair of nip rollers to form a combined carbon nanomaterial composite sheet-resin film, before passing through the pair of joining rollers 308. As one example, the resin film 144 makes up between approximately 35 percent to approximately 50 percent by weight of the carbon nanomaterial composite sheet-resin film laminate.

Figure 8:
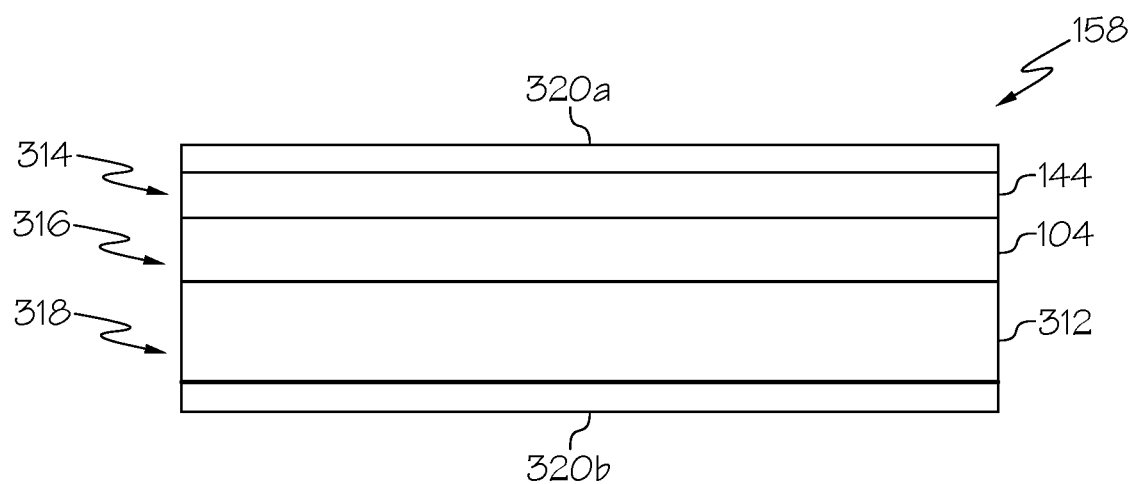
FIG. 8 is a schematic side elevation view of one example of a combined sheet.

FIG. 8 illustrates one example of the combined sheet 158 according to the material configuration of the resin film 144, the nanomaterial composite sheet 104 and the pre-impregnated fiber-reinforcing sheet 312 passing through the pair of joining rollers 308 illustrated in FIG. 7. The resin film 144 forms (e.g., define) a resin film layer 314, for example, defining a top layer. The nanomaterial composite sheet 104 forms a nanomaterial composite sheet layer 316 (e.g., a carbon nanomaterial composite sheet layer, a boron nanomaterial composite sheet layer, etc.), for example, defining an interstitial layer. The pre-impregnated fiber-reinforcing sheet 312 forms a pre-impregnated fiber-reinforcing sheet layer 318, for example, defining a bottom layer. Thus, as one example, the resin system 106 is formed by a combination of the resin 146 from the resin film 144 and the resin 146 from the pre-impregnated fiber-reinforcing sheet 312.

In one example, the combined sheet 158 also includes a first protective sheet 320a releasably coupled to the resin film 144 (e.g., the resin film layer 314) and a second protective sheet 320b releasably coupled to the pre-impregnated fiber-reinforcing sheet 312 (e.g., the pre-impregnated fiber-reinforcing sheet layer 318). The first protective sheet 320a may be provided with the resin film 144 or may be applied to the resin film 144 before passing through the pair of joining rollers 308. Similarly, the second protective sheet 320b may be provided with pre-impregnated fiber-reinforcing sheet 312 or may be applied to pre-impregnated fiber-reinforcing sheet 312 before passing through pair of joining rollers 308.

The first protective sheet 320a and the second protective sheet 320b may protect the resin film 144, the nanomaterial composite sheet 104 and the pre-impregnated fiber-reinforcing sheet 312 (e.g., the combined sheet 158) when passing through the pair of joining roller 308 and the pairs of compacting rollers 322, and when passing over the heat plate 324 and the cold plate 326 (FIG. 6). The first protective sheet 320a and the second protective sheet 320b may also be referred to as a protective layer or a release film.

As one example, the first protective sheet 320a and/or the second protective sheet 320b include (e.g., take the form of) a sheet of a polytetrafluoroethylene glass material, such as ARMALON™ polytetrafluoroethylene glass laminate, paper, a polyester film, a sheet of polyethylene terephthalate (PET) (e.g., MYLAR®) and the like. In one example, at least one of the first protective sheet 320a and/or the second protective sheet 320b forms the protective sheet 156 (FIGS. 2 and 3) of the conductive pre-impregnated composite sheet 100.

Figure 9:
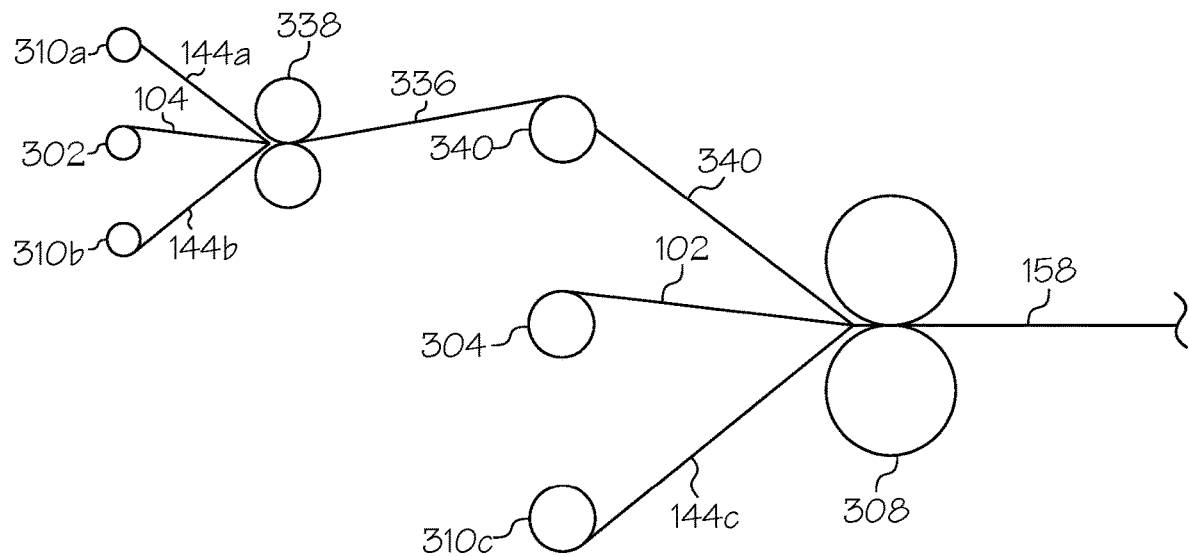
FIG. 9 is a partial schematic block diagram of another example of the input material configuration for the system of FIG. 6.

FIG. 9 illustrates another example material configuration of the resin film 144, the nanomaterial composite sheet 104 and the fiber-reinforcing sheet 102, for example, as passing through the pair of joining rollers 308.

In one example, the resin system 106 is formed by a plurality of resin films 144. As one specific, non-limiting example, each one of the plurality of resin films 144 is a film of Cycom 977-3 epoxy resin.

In one example, at least a portion of the resin system 106 is integrated with or coupled to the nanomaterial composite sheet 104 to form a laminate (identified herein as a carbon nanomaterial composite sheet-resin film 336). As one example, a first resin film 144a is provided, for example, from a first resin film-supply reel 310a. In one example, the nanomaterial composite sheet 104 is provided, for example, from the nanomaterial composite sheet-supply reel 302. In one example, a second resin film 144b is also provided, for example, from a second resin film-supply reel 310b. In one example, the first resin film 144a, the nanomaterial composite sheet 104 and the second resin film 144b are coupled together by a pair of nip rollers 338 before passing through the pair of joining rollers 308. As an alternative example, the carbon nanomaterial composite sheet-resin film 336 is provided, for example, from a carbon nanomaterial composite sheet-resin film-supply reel 340.

As one example, the first resin film 144a includes a basis weight of approximately 41 gsm. As one example, the nanomaterial composite sheet 104 includes a basis weight of between approximately 60 gsm and approximately 70 gsm. As one example, the second resin film 144b includes a basis weight of approximately 42 gsm. As one example, the carbon nanomaterial composite sheet-resin film 336 includes a basis weight of between approximately 135 gsm and approximately 175 gsm. As one example, the first resin film 144a and the second resin film 144b make up between approximately 35 percent and approximately 50 percent by weight of the carbon nanomaterial composite sheet-resin film 336. The content of the resin 146 (FIG. 1) from the first resin film 144a and/or the second resin 144b may be tailorable based on need.

In one example, the fiber-reinforcing sheet 102 is provided, for example, from the fiber-reinforcing sheet-supply reel 304. As one example, the fiber-reinforcing sheet 102 is dry (e.g., contains no resin). As examples, the fiber-reinforcing sheet 102 is provided as a woven or a nonwoven sheet of the fiber-reinforcing material 142 (e.g., the carbon fiber sheet 116) (FIG. 1). As another example, the fiber-reinforcing sheet 102 is provided as a plurality of tows of the fiber-reinforcing material 142 (e.g., the carbon fiber tows 138) (FIG. 1), for example, from a plurality of supply creels (not explicitly illustrated). As one example, the fiber-reinforcing sheet 102 includes a basis weight of between approximately 120 gsm and approximately 175 gsm.

As one specific, non-limiting example, the fiber-reinforcing sheet 102 (e.g., fiber-reinforcing material 142) is IM7 carbon fiber material.

Other non-limiting examples of fiber-reinforcing sheet 102 (e.g., fiber-reinforcing material 142) include IM8, IMS60, IMS65, AS4, AS4A, AS4C, AS4D, AS7, IM2A, IM2C, IM6, IM9, IM10, HM63, UTS50, ITS50, HTS45, STS40, HTA40, HTS40 MC, UMS40, UMS45, E-glass, S-glass, 7781 fiberglass, 4581 quartz, T300, T300J, T400H, T650, T700S, T700G, T800H, T800S, T1000G, M305, M30G, M35J, M40, M40J, M46J, M50J, M55J, M60J, IMA, Kevlar, UHMWPE, Spectra, Dyneema, Zoltek PX35, Zoltek PX30, Zoltek OX and the like or a combination thereof.

In one example, a third resin film 144c is provided, for example, from a third resin film-supply reel 310c. As one specific, non-limiting example, the third resin film 144c is a film of Cycom 977-3 epoxy resin. As one example, the third resin film 144c includes a basis weight of between approximately 45 grams per gsm and approximately 55 gsm. The content of resin 146 (FIG. 1) from the third resin film 144c may be tailorable based on need.

Figure 10:
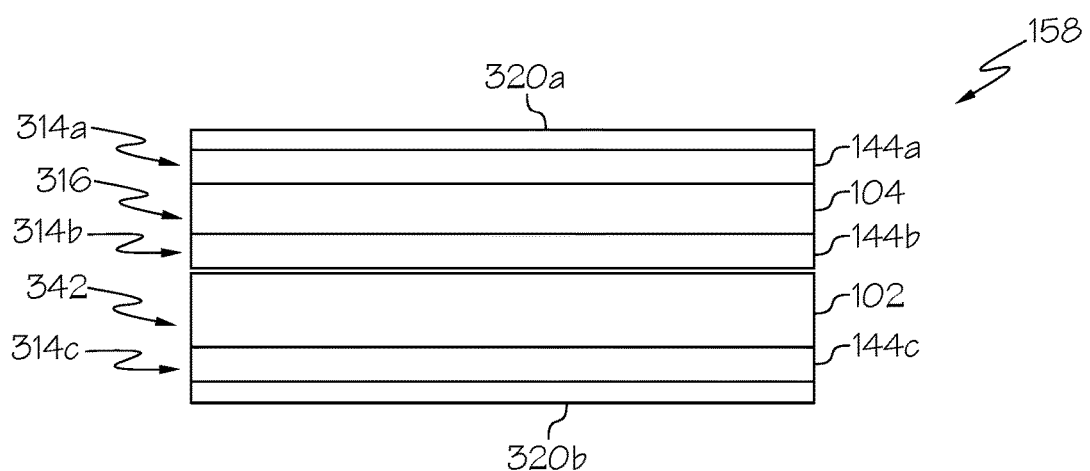
FIG. 10 is a schematic side elevation view of another example of the combined sheet.

FIG. 10 illustrates another example of the combined sheet 158 according to the material configuration of the resin film 144, the nanomaterial composite sheet 104 and the fiber-reinforcing sheet 102 passing through the pair of joining rollers 308 illustrated in FIG. 9. The first resin film 144a forms (e.g., define) a first resin film layer 314a, for example, defining a top layer. The nanomaterial composite sheet 104 forms the nanomaterial composite sheet layer 316, for example, defining a first interstitial layer adjacent to top layer. The second resin film 144b forms a second resin film layer 314b, for example, defining a second interstitial layer adjacent to the first interstitial layer. The fiber-reinforcing sheet 102 forms a fiber-reinforcing sheet layer 342, for example, defining a third interstitial layer adjacent to the second interstitial layer. The third resin film 144c forms a third resin film layer 314c, for example, defining a bottom layer. Thus, the resin system 106 is formed by a combination of the resin 146 from the first resin film 144a, the resin 146 from the second resin film 144b and the resin 146 from the third resin film 144c.

In one example, the combined sheet 158 also includes the first protective sheet 320a releasably coupled to the first resin film 144a (e.g., the first resin film layer 314a) and the second protective sheet 320b releasably coupled to the third resin film 144c (e.g., the third resin film layer 314c). The first protective sheet 320a may be provided with the first resin film 144a or may be applied to the first resin film 144a before passing through the pair of nip rollers 338 and being joined to the nanomaterial composite sheet 104. Similarly, the second protective sheet 320b may be provided with the third resin film 144c or may be applied to the third resin film 144c before passing through the pair of joining rollers 308.

First protective sheet 320a and the second protective sheet 320b may protect the resin film 144, the nanomaterial composite sheet 104 and the fiber-reinforcing sheet 102 (e.g., the combined sheet 158) when passing through the pair of joining roller 308 and the pairs of compacting rollers, and when passing over the heat plate 324 and the cold plate 326. The first protective sheet 320a and the second protective sheet 320b may also be referred to as a protective layer or a release film.

As one example, the first protective sheet 320a and/or the second protective sheet 320b include (e.g., take the form of) a sheet of a polytetrafluoroethylene glass material, such as ARMALON™ polytetrafluoroethylene glass laminate, paper, a polyester film, a sheet of polyethylene terephthalate (PET) (e.g., MYLAR®) and the like. One of first protective sheet 320a and second protective sheet 320b may form protective sheet 156 (FIGS. 2 and 3) of conductive pre-impregnated composite sheet 100.

In other examples, different material configurations of the resin film 144, the nanomaterial composite sheet 104 and/or the fiber-reinforcing sheet 102 may be used to form the combined sheet 158. As one example, the combined sheet 158 includes the nanomaterial composite sheet 104 and the pre-impregnated fiber-reinforcing sheet 312 (e.g., is formed from the nanomaterial composite sheet layer 316 and the pre-impregnated fiber-reinforcing sheet layer 318. As another example, the combined sheet 158 includes the nanomaterial composite sheet 104, the fiber-reinforcing sheet 102 and two resin films 144 (e.g., is formed from the carbon nanomaterial composite sheet layer 316, the fiber-reinforcing sheet layer 342 and two resin film layers 314). In yet another example, the combined sheet 158 includes the nanomaterial composite sheet 104, the fiber-reinforcing sheet 102 and more than three resin films 144 (e.g., is formed from the carbon nanomaterial composite sheet layer 316, the fiber-reinforcing sheet layer 342 and more than three resin film layers 314).

Referring to FIG. 5, in one example, the method 200 includes the step of forming conductive pre-impregnated composite sheet 100, as shown at block 218.

Referring to FIG. 6, and with reference to FIG. 5, in one example, following the joining step (block 208), the heating step (block 210), the compacting step (block 212, the cooling step (block 214) and, optionally, the trimming step (block 216), the conductive pre-impregnated composite sheet 100 is taken up by a conductive pre-impregnated composite sheet-take up reel 334. In one example, the first protective sheet 320a (FIG. 10) is removed from the conductive pre-impregnated composite sheet 100 and taken up by a protective sheet-take up reel 332.

As one example, the conductive pre-impregnated composite sheet 100 includes a basis weight of between approximately 300 gsm and approximately 355 gsm. As one specific, non-limiting example, the resin system 106 (e.g., the resin 146) makes up between approximately 30 percent and approximately 52 percent by weight of the conductive pre-impregnated composite sheet 100. As another specific, non-limiting example, the resin system 106 makes up between approximately 35 percent and approximately 50 percent by weight of conductive pre-impregnated composite sheet 100. As another specific, non-limiting example, the resin system 106 makes up between approximately 35 percent and approximately 40 percent by weight of conductive pre-impregnated composite sheet 100. As yet another specific, non-limiting example, the resin system 106 makes up approximately 35 percent by weight of conductive pre-impregnated composite sheet 100.

The content of the resin 146 (resin content) in the conductive pre-impregnated composite sheet 100 (e.g., the percent by weight of the resin system 106) may be adjusted to achieve desired (e.g., balanced or optimized) mechanical and electrical properties in the conductive pre-impregnated composite sheet 100. As one example, the resin content may be increased to increase the mechanical properties of the conductive pre-impregnated composite sheet 100. As another example, the resin content may be decreased to increase the conductivity (e.g., decrease resistivity) of the conductive pre-impregnated composite sheet 100.

Referring to FIG. 11, and with reference to FIG. 1, one example of the composite structure 400 is disclosed. In one example, the composite structure 400 includes at least one fiber-reinforced polymer sheet 402 (e.g., a prepreg carbon fiber sheet) and at least one conductive pre-impregnated composite sheet 100. The conductive pre-impregnated composite sheet 100 includes at least the nanomaterial composite sheet 104 (including the nanomaterial structure 110 and the carrier sheet 108), the fiber-reinforcing sheet 102 and the resin system 106.

In one example, the composite structure 400 is a composite laminate. As one example, the composite structure 400 includes one or more layers formed from the fiber-reinforced polymer sheets 402 (e.g., three fiber-reinforced polymer sheets 402 are illustrated by example). As examples, each one of the fiber-reinforced polymer sheets 402 includes a sheet, mat, or ply of reinforcing fibrous material (not explicitly illustrated) bonded together by a polymer matrix (not explicitly illustrated). The fibrous material may include any suitable woven or nonwoven (e.g., knit, braided or stitched) continuous reinforcing fibers or filaments. The polymer matrix material may include any suitable thermoset resin (e.g., epoxy) or thermoplastic.

Various known processes or techniques may be used to make the fiber-reinforced polymer sheets 402. As one example, each one of the fiber-reinforced polymer sheets 402 includes a sheet of the reinforcing fibrous material pre-impregnated with the polymer matrix material (e.g., a prepreg), also known as a dry layup. As one example, each one of the fiber-reinforced polymer sheets 402 includes a sheet of the reinforcing fibrous material and the polymer matrix material is applied to the reinforcing fibrous material, also known as a wet layup.

In one example, the composite structure 400 also includes at least one layer formed from the conductive pre-impregnated composite sheet 100. Various known processes or techniques may be used to make the composite structure 400. In one example, the fiber-reinforced polymer sheets 402 and the conductive pre-impregnated composite sheet 100 are consecutively laid up, for example, within a mold (not explicitly illustrated). The fiber-reinforced polymer sheets 402 and the conductive pre-impregnated composite sheet 100 are then co-cured to form the composite structure 400.

As one example, and as illustrated in FIG. 11, the conductive pre-impregnated composite sheet 100 forms an outermost layer of the composite lay-up (e.g., defining an exterior surface layer of the composite structure 400). As another example, the conductive pre-impregnated composite sheet 100 forms an interior layer of the composite lay-up (e.g., defining an interior layer of the composite structure 400).

Generally, the composite structure 400 may include any desired three-dimensional ("3D") shape. The 3D shape may include various dimensions including a length dimension, a width dimension, a height dimension and/or a cross-sectional dimension of the composite structure 400. As one specific, non-limiting example, the composite structure 400 is a skin panel of an aircraft, such as an aircraft 1200 (FIG. 13).

Accordingly, the disclosed conductive pre-impregnated composite sheet 100 may be integrated into a production process for making the composite structure 400. The conductive pre-impregnated composite sheet 100 may provide the composite structure 400 with effective shielding against, for example, EMI and ionizing radiation and effective lighting strike protection without the need for additional materials.

The disclosed conductive pre-impregnated composite sheet 100 may have broadband EMI shielding effectiveness. As one example, the conductive pre-impregnated composite sheet 100 including the nanomaterial composite sheet 104 (e.g., the nanomaterial structure 110 coupled to the carrier sheet 108) may be provide effective EMI shielding at medium frequencies (between approximately 100 MHz and approximately 1 GHz) and at high frequencies (greater than approximately 1 GHz). As one example, the conductive pre-impregnated composite sheet 100 including the nanomaterial composite sheet 104 with the metallic coating 124 (e.g., the nanomaterial structure 110 coupled to the carrier sheet 108 having the nickel coating 126) may be provide effective EMI shielding at low frequencies (less than approximately 100 MHz), medium frequencies (between approximately 100 MHz and approximately 1 GHz), and at high frequencies (greater than approximately 1 GHz).

Similarly, the composite structure 400 formed from the conductive pre-impregnated composite sheet 100 may have broadband EMI shielding effectiveness, which may be particularly beneficial in aerospace applications since each radio frequency (RF) band may affect electronics and avionics differently. As one example, the composite structure 400 including the conductive pre-impregnated composite sheet 100 (e.g., the nanomaterial composite sheet 104 including the nanomaterial structure 110 coupled to the carrier sheet 108) may be provide effective EMI shielding at medium frequencies (between approximately 100 MHz and approximately 1 GHz) and at high frequencies (greater than approximately 1 GHz). As one example, the composite structure 400 including the conductive pre-impregnated composite sheet 100 with the metallic coating 124 (e.g., the nanomaterial structure 110 coupled to the carrier sheet 108 having the nickel coating 126) may be provide effective EMI shielding at low frequencies (less than approximately 100 MHz), medium frequencies (between approximately 100 MHz and approximately 1 GHz), and at high frequencies (greater than approximately 1 GHz).

Additionally, use of a dielectric material as the carrier sheet 108 or including a dielectric layer (not explicitly illustrated) coupled to the carrier sheet 108 may provide a barrier to the underlying composite structure 400 for lightning protection by, for example, keeping the lightning current at the surface in the event of a lightning strike and allowing the nanomaterial composite sheet 104 of the conductive pre-impregnated composite sheet 100 to conduct away the energy before it gets into and causes damage to the underlying composite structure 400.

Examples of the conductive pre-impregnated composite sheet 100 and the composite structure 400 and the methods for making the same disclosed herein may be described in the context of an aircraft manufacturing and service method 1100 as shown in FIG. 12 and the aircraft 1200 as shown in FIG. 13.

During pre-production, the illustrative method 1100 may include specification and design, as shown at block 1102, of aircraft 1200, which may include design of conductive pre-impregnated composite sheet 100 and/or composite structure 400, and material procurement, as shown at block 1104. During production, component and subassembly manufacturing, as shown at block 1106, and system integration, as shown at block 1108, of the aircraft 1200 may take place. Production of conductive pre-impregnated composite sheet 100 and use of conductive pre-impregnated composite sheet 100 in composite structure 400, as described herein, may be accomplished as a portion of the production, component and subassembly manufacturing step (block 1106) and/or as a portion of the system integration (block 1108). Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, the aircraft 1200 produced by the illustrative method 1100 may include an airframe 1202, for example, having composite skin panels including the conductive pre-impregnated composite sheet 100, a plurality of high-level systems 1204 and an interior 1206. Examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while the aircraft 1200 is in service (block 1112). Also, one or more examples of the systems, apparatus, and methods, or combination thereof may be utilized during production stages (blocks 1108 and 1110), for example, by increasing the effective EMI shielding and/or lightning protection of the aircraft 1200. Similarly, one or more examples of the systems, apparatus, and methods, or a combination thereof, may be utilized, for example and without limitation, while the aircraft 1200 is in service (block 1112) and during maintenance and service stage (block 1114).

Although various examples of the disclosed conductive pre-impregnated composite sheet, composite structure and methods have been shown and described, modifications may occur to those skilled in the art upon reading the specification. The present application includes such modifications and is limited only by the scope of the claims.

What is claimed is:

1. A conductive pre-impregnated composite sheet comprising:
    a fiber-reinforcing sheet;
    a nanomaterial composite sheet coupled to the fiber-reinforcing sheet, wherein the nanomaterial composite sheet comprises:
        a nonwoven veil having a first surface and a second surface, opposite the first surface; and
        a nonwoven mat of nanomaterials coupled to the first surface of the nonwoven veil; and
    a resin system in which the fiber-reinforcing sheet and the nanomaterial composite sheet are embedded.

2. The conductive pre-impregnated composite sheet of claim 1 wherein the fiber-reinforcing sheet comprises carbon fibers.

3. The conductive pre-impregnated composite sheet of claim 1 wherein the fiber-reinforcing sheet is nonwoven.

4. The conductive pre-impregnated composite sheet of claim 1 wherein the fiber-reinforcing sheet comprises a nonwoven carbon fiber sheet.

5. The conductive pre-impregnated composite sheet of claim 1 wherein the fiber-reinforcing sheet comprises a plurality of unidirectional, continuous carbon fiber tows.

6. The conductive pre-impregnated composite sheet of claim 1 wherein the nanomaterial composite sheet is electrically conductive along at least one axial direction.

7. The conductive pre-impregnated composite sheet of claim 1 wherein the nonwoven veil comprises a nonwoven carbon fiber veil.

8. The conductive pre-impregnated composite sheet of claim 1 wherein the nanomaterial composite sheet comprises a metallic coating applied to the second surface of the nonwoven veil.

9. The conductive pre-impregnated composite sheet of claim 8 wherein the metallic coating comprises nickel.

10. The conductive pre-impregnated composite sheet of claim 8 wherein the metallic coating is opaque to electromagnetic radiation having a frequency less than 100 MHz.

11. The conductive pre-impregnated composite sheet of claim 1 wherein the nonwoven mat of nanomaterials is conductive.

12. The conductive pre-impregnated composite sheet of claim 1 wherein the nonwoven mat of nanomaterials comprises a network of the nanomaterials deposited on and entangled with the first surface of the nonwoven veil.

13. The conductive pre-impregnated composite sheet of claim 12 wherein:
    the nonwoven veil is porous;
    the network of the nanomaterials is deposited on and entangled with the first surface of the nonwoven veil by filtering a slurry of the nanomaterials through the nonwoven veil; and
    at least some of the nanomaterials penetrate through at least a portion of a thickness of the nonwoven veil.

14. The conductive pre-impregnated composite sheet of claim 1 wherein the nonwoven mat of nanomaterials is opaque to electromagnetic radiation having a frequency greater than 100 MHz.

15. The conductive pre-impregnated composite sheet of claim 1 wherein the nonwoven mat of nanomaterials comprises at least one of carbon nanomaterials and boron nanomaterials.

16. The conductive pre-impregnated composite sheet of claim 1 wherein:
    the resin system comprises a resin film;
    the fiber-reinforcing sheet, the nanomaterial composite sheet, and the resin film are joined to form a combined sheet;
    the combined sheet is heated to a temperature in which resin from the resin film begins to flow; and
    the combined sheet is compacted to embed the fiber-reinforcing sheet and the nanomaterial composite sheet in the resin system.

17. The conductive pre-impregnated composite sheet of claim 16 wherein the nanomaterial composite sheet is located between the resin film and the fiber-reinforcing sheet in the combined sheet.

18. The conductive pre-impregnated composite sheet of claim 1 wherein:
    the resin system comprises resin pre-impregnated within the fiber-reinforcing sheet;
    the fiber-reinforcing sheet and the nanomaterial composite sheet are joined to form a combined sheet;
    the combined sheet is heated to a temperature in which the resin begins to flow; and
    the combined sheet is compacted to embed the fiber-reinforcing sheet and the nanomaterial composite sheet in the resin system.

19. The conductive pre-impregnated composite sheet of claim 1 wherein the fiber-reinforcing sheet is coupled to the second surface of the nonwoven veil, opposite the nonwoven mat of nanomaterials.

20. A composite structure comprising:
    at least one fiber-reinforced polymer sheet; and
    a conductive pre-impregnated composite sheet, wherein the conductive pre-impregnated composite sheet comprises:
        a fiber-reinforcing sheet;
        a nanomaterial composite sheet coupled to the fiber-reinforcing sheet, wherein the nanomaterial composite sheet comprises:
            a nonwoven veil having a first surface and a second surface, opposite the first surface; and
            a nonwoven mat of nanomaterials coupled to the first surface of the nonwoven veil; and
        a resin system in which the fiber-reinforcing sheet and the nanomaterial composite sheet are embedded.

* * * * *